United States Patent
Zhang et al.

(10) Patent No.: US 11,172,492 B2
(45) Date of Patent: Nov. 9, 2021

(54) POWER SAVING FOR PEDESTRIAN USER EQUIPMENT IN VEHICULAR COMMUNICATIONS SYSTEMS

(71) Applicant: Apple Inc., Cupertino, CA (US)

(72) Inventors: Wei Zhang, Santa Clara, CA (US); Wanping Zhang, San Jose, CA (US); Haitong Sun, Irvine, CA (US); Yuqin Chen, Shenzhen (CN); Pengkai Zhao, San Jose, CA (US); Jia Tang, San Jose, CA (US); Ping Wang, San Jose, CA (US); Wei Zeng, San Diego, CA (US); Haijing Hu, Beijing (CN); Dawei Zhang, Saratoga, CA (US); Sami M. Almalfouh, San Jose, CA (US); Johnson O. Sebeni, Fremont, CA (US)

(73) Assignee: Apple Inc., Cupertino, CA (US)

( * ) Notice: Subject to any disclaimer, the term of this patent is extended or adjusted under 35 U.S.C. 154(b) by 62 days.

(21) Appl. No.: 16/591,429

(22) Filed: Oct. 2, 2019

(65) Prior Publication Data
US 2020/0196240 A1 Jun. 18, 2020

Related U.S. Application Data

(60) Provisional application No. 62/778,373, filed on Dec. 12, 2018.

(51) Int. Cl.
*H04W 72/10* (2009.01)
*H04W 76/28* (2018.01)
(Continued)

(52) U.S. Cl.
CPC .......... *H04W 72/10* (2013.01); *G05D 1/0022* (2013.01); *G05D 1/028* (2013.01);
(Continued)

(58) Field of Classification Search
CPC ..... H04W 72/10; H04W 76/28; H04W 4/029; H04W 72/1242; H04W 72/1289;
(Continued)

(56) References Cited

U.S. PATENT DOCUMENTS

| 10,659,936 B2 | 5/2020 | Cheng et al. |
| 2014/0051346 A1* | 2/2014 | Li .......................... H04W 4/90 |
| | | 455/3.01 |

(Continued)

FOREIGN PATENT DOCUMENTS

| KR | 2019100104 | 8/2019 |
| WO | WO-2018031241 A1 * | 2/2018 ........... H04B 7/0834 |

*Primary Examiner* — Shailendra Kumar
(74) *Attorney, Agent, or Firm* — Kowert, Hood, Munyon, Rankin & Goetzel, P.C.

(57) ABSTRACT

Embodiments are presented herein for adjusting the conduct of routine communications of safety messages in V2X networks in order to conserve resources in participating power-limited devices while satisfying V2X system latency demands. Scheduling (e.g., timing and/or frequency) of safety message communications performed by certain UE devices participating in a V2X network may be dynamically adjusted according to various criteria, such as factors relating to the DRX cycle schedule, motion or mobility, traffic environment, and/or battery or power capabilities of the UE devices, which may conserve UE resources and power consumption. Certain UE devices may efficiently transmit safety messages to the V2X network using one of several proposed RACH-based procedures. In some embodiments, the size of safety message communications may be reduced through various compression techniques, and/or by reducing the amount of contained information, e.g., by omitting certain parameters, which may reduce the resources consumed by performing safety message communications.

20 Claims, 12 Drawing Sheets

(51) Int. Cl.
*H04W 4/029* (2018.01)
*G08G 1/16* (2006.01)
*H04W 4/02* (2018.01)
*H04W 8/08* (2009.01)
*H04W 52/02* (2009.01)
*H04W 72/12* (2009.01)
*H04W 74/00* (2009.01)
*H04W 76/27* (2018.01)
*G05D 1/00* (2006.01)
*G05D 1/02* (2020.01)
*H04W 4/40* (2018.01)

(52) U.S. Cl.
CPC ............ *G05D 1/0289* (2013.01); *G08G 1/161* (2013.01); *H04W 4/027* (2013.01); *H04W 4/029* (2018.02); *H04W 4/40* (2018.02); *H04W 8/08* (2013.01); *H04W 52/0229* (2013.01); *H04W 72/1284* (2013.01); *H04W 74/004* (2013.01); *H04W 76/27* (2018.02); *H04W 76/28* (2018.02)

(58) Field of Classification Search
CPC ... H04W 4/027; H04W 8/08; H04W 52/0229; H04W 72/1284; H04W 74/004; H04W 76/27; H04W 4/40; H04W 4/025; G08G 1/161; G08G 1/166; G08G 1/005; G05D 1/028; G05D 1/0022; G05D 1/0289; H04L 67/325; Y02D 30/70
See application file for complete search history.

(56) References Cited

U.S. PATENT DOCUMENTS

| | | | |
|---|---|---|---|
| 2015/0289229 A1* | 10/2015 | Ahluwalia | H04W 68/02 455/458 |
| 2018/0084369 A1* | 3/2018 | Hou | H04W 4/00 |
| 2018/0205512 A1* | 7/2018 | You | H04L 5/0053 |
| 2018/0249442 A1* | 8/2018 | Xu | H04W 72/042 |
| 2018/0262865 A1 | 9/2018 | Lepp et al. | |
| 2018/0263052 A1* | 9/2018 | Xu | H04Q 11/02 |
| 2018/0279224 A1 | 9/2018 | Yang | |
| 2019/0028897 A1* | 1/2019 | Ying | H04W 12/75 |
| 2019/0036652 A1* | 1/2019 | Baghel | H04L 1/1896 |
| 2019/0037555 A1 | 1/2019 | Kim et al. | |
| 2019/0254110 A1* | 8/2019 | He | H04L 5/0048 |
| 2020/0029302 A1* | 1/2020 | Cox | H04W 56/0015 |
| 2020/0196240 A1 | 6/2020 | Zhang et al. | |
| 2020/0196321 A1 | 6/2020 | Zhang et al. | |
| 2021/0012661 A1* | 1/2021 | Yang | G08G 1/166 |

\* cited by examiner

POWER SAVING FOR PEDESTRIAN USER EQUIPMENT IN VEHICULAR COMMUNICATIONS SYSTEMS

PRIORITY CLAIM

The present application claims benefit of priority to U.S. Provisional Application No. 62/778,373 titled "Power Saving for Pedestrian User Equipment in Vehicular Communication Systems" filed on Dec. 12, 2018, which is hereby incorporated by reference as though fully and completely set forth herein.

FIELD

The present application relates to wireless devices, and more particularly to an apparatus, system, and method for wireless devices with limited power capabilities to perform improved communications in vehicular applications with latency demands.

DESCRIPTION OF THE RELATED ART

Wireless communication systems are rapidly growing in usage. One proposed use of wireless communications is in vehicular applications, particularly in V2X (vehicle-to-everything) systems. V2X systems allow for communication between vehicles (e.g., via communications devices housed in or otherwise carried by vehicles), pedestrian UEs (including UEs carried by other persons such as cyclists, etc.), and other wireless communications devices for various purposes, such as to coordinate traffic activity, facilitate autonomous driving, and perform collision avoidance.

The increased communication requirements of certain V2X systems may strain the power and resource capabilities of portable, battery-powered UE devices. In addition, legacy UEs that are unable to communicate in a sidelink manner with neighboring UEs (without an intermediary base station) may present issues in participating in V2X systems. Accordingly, improvements in the field would be desirable.

SUMMARY

Embodiments are presented herein of apparatuses, systems, and methods for adjusting the conduct of routine communications of safety messages in V2X networks in order to conserve resources in participating power-limited devices, particularly pedestrian UEs (PUEs), while satisfying V2X system latency demands.

User devices (e.g., vehicles and pedestrian UEs) in a V2X system may routinely or regularly communicate messages within the V2X network containing certain update or status information usable for coordinating traffic activity. These routine messages, i.e., "safety messages", may include various data related to their respective user devices, such as movement information (e.g., speed, acceleration, and/or brake status), position or location information (e.g., latitude and longitude, elevation, etc.), and other possible details.

Safety message communications may be performed with a relatively high frequency so that the V2X network may effectively coordinate traffic activity. User devices may frequently transmit safety messages, as well as frequently monitor for incoming safety message information. Such active communications may consume device resources, e.g., power, at a relatively high rate. This may especially strain the resource and power capabilities of UE devices, such as pedestrian UE (PUE) devices.

According to some embodiments, a V2X network, e.g., a base station, may operate to schedule certain safety message communications so that they occur in the wake-up windows of one or more UEs. In some embodiments, the V2X network may provide uplink scheduling information to one or more UEs specifying scheduling of transmission resources for safety messages in time windows proximate to UE wake-up times. If safety message communications are accommodated into wake-up windows of the one or more UEs, e.g., CDRX or idle mode DRX wake-up instances, the UEs may not need to perform additional wake-ups to communicate safety messages, which may tend to conserve their power.

According to some embodiments, a V2X network, e.g., a base station, may operate to reduce the frequency of safety message communications conducted by a UE device in order to conserve the UE's resources or power. In various embodiments, adjustments in the frequency, or periodicity, of safety message communication may be determined based on various criteria, such as factors relating to the motion/mobility, position, traffic environment, and/or power capabilities or battery level of the UE. In some embodiments, the base station may provide uplink scheduling information to the UE that indicates a reduction in the frequency of uplink transmissions of safety messages according to one or more of these factors.

In some embodiments, a V2X network, e.g., a base station, may operate to adjust safety message scheduling for a group of one or more user devices, e.g., UEs, in the network based on overall activity in the network or in a certain area in the network coverage. For example, in some embodiments the base station may communicate information specifying new safety message transmission scheduling to a plurality of UEs at least partly based on aggregated or statistical activity and/or movement metrics received or derived from one or more user devices, e.g., within the coverage area of the base station.

In some embodiments, a UE in a V2X network may operate to adjust the frequency of its safety message scheduling according to motion or traffic activity detected in its environment. In some embodiments, the UE may monitor synchronization messages sent by nearby user devices in order to assess traffic activity in its environment, such as the relative speed or other motion-related factors of the nearby user devices.

According to some embodiments, a UE participating in a V2X network may transmit safety messages to the network, e.g., a base station, using a proposed modified random-access channel (RACH) procedure, i.e., a RACH-based procedure. In some embodiments, the UE may perform a three-step RACH-based procedure involving three primary RACH messages in order to communicate a safety message to the base station, and the UE may include the safety message as part of the third RACH message. In other embodiments, the UE may perform a two-step RACH-based procedure involving two primary RACH messages, and the UE may include the safety message as part of the first RACH message. By incorporating safety message transmissions into a RACH communications framework, the V2X network may communicate safety messages more efficiently, and may mitigate UE power consumption and communication delays.

According to some embodiments, the size of safety messages (or of safety message communications) may be adjusted and reduced, which may tend to reduce the resources consumed by a UE performing safety message communications. The size of safety messages (or safety message communications) may be reduced through various compression techniques, and/or by reducing the amount of information contained in safety messages, e.g., by omitting certain parameters. In various embodiments, adjustments in the size and contents of safety messages may be determined based on various criteria, such as factors relating to the motion, mobility, position, traffic environment, and/or power capabilities or battery level of the UE.

Some embodiments relate to a base station having at least one antenna for performing wireless communications, a radio, and a processing element coupled to the radio. The base station may perform various of the methods described herein. Some embodiments may relate to a user equipment (UE) device having at least one antenna for performing wireless communications, a radio, and a processing element coupled to the radio. The UE may perform at least some of the methods described herein.

In some embodiments, a non-transitory memory medium may include program instructions executable by a UE that, when executed, cause the UE to perform at least a portion or all of the above operations. In some embodiments, a method performed by the UE may include the UE performing the above operations.

This Summary is intended to provide a brief overview of some of the subject matter described in this document. Accordingly, it will be appreciated that the above-described features are merely examples and should not be construed to narrow the scope or spirit of the subject matter described herein in any way. Other features, aspects, and advantages of the subject matter described herein will become apparent from the following Detailed Description, Figures, and Claims.

BRIEF DESCRIPTION OF THE DRAWINGS

A better understanding of the present subject matter can be obtained when the following detailed description of various embodiments is considered in conjunction with the following drawings, in which.

Figure 1:
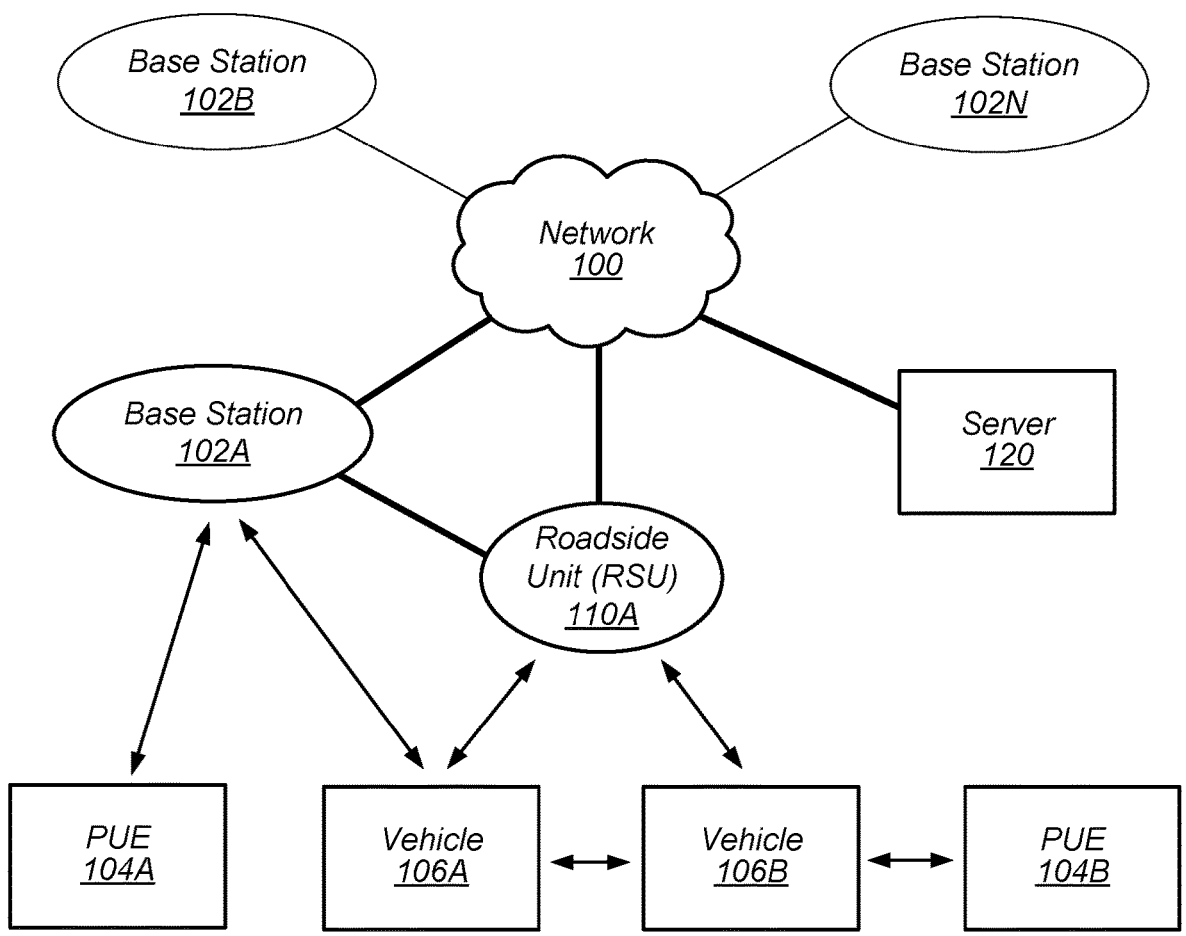
FIG. 1 illustrates an example vehicle-to-everything (V2X) communication system, according to some embodiments.

While the features described herein may be susceptible to various modifications and alternative forms, specific embodiments thereof are shown by way of example in the drawings and are herein described in detail. It should be understood, however, that the drawings and detailed description thereto are not intended to be limiting to the particular form disclosed, but on the contrary, the intention is to cover all modifications, equivalents and alternatives falling within the spirit and scope of the subject matter as defined by the appended claims.

DETAILED DESCRIPTION

Terms

The following is a glossary of terms used in this disclosure:

Memory Medium—Any of various types of non-transitory memory devices or storage devices. The term "memory medium" is intended to include an installation medium, e.g., a CD-ROM, floppy disks, or tape device; a computer system memory or random-access memory such as DRAM, DDR RAM, SRAM, EDO RAM, Rambus RAM, etc.; a non-volatile memory such as a Flash, magnetic media, e.g., a hard drive, or optical storage; registers, or other similar types of memory elements, etc. The memory medium may include other types of non-transitory memory as well or combinations thereof. In addition, the memory medium may be located in a first computer system in which the programs are executed, or may be located in a second different computer system which connects to the first computer system over a network, such as the Internet. In the latter instance, the second computer system may provide program instructions to the first computer for execution. The term "memory medium" may include two or more memory mediums which may reside in different locations, e.g., in different computer systems that are connected over a network. The memory medium may store program instructions (e.g., embodied as computer programs) that may be executed by one or more processors.

Programmable Hardware Element—includes various hardware devices comprising multiple programmable function blocks connected via a programmable interconnect. Examples include FPGAs (Field Programmable Gate Arrays), PLDs (Programmable Logic Devices), FPOAs (Field Programmable Object Arrays), and CPLDs (Complex PLDs). The programmable function blocks may range from fine grained (combinatorial logic or look up tables) to coarse grained (arithmetic logic units or processor cores). A programmable hardware element may also be referred to as "reconfigurable logic".

Computer System—any of various types of computing or processing systems, including a personal computer system (PC), mainframe computer system, workstation, network appliance, Internet appliance, personal digital assistant (PDA), television system, grid computing system, or other device or combinations of devices. In general, the term "computer system" can be broadly defined to encompass any device (or combination of devices) having at least one processor that executes instructions from a memory medium.

User Device—as used herein, may refer generally in the context of V2X systems to devices that are associated with mobile actors or traffic participants in a V2X system, i.e., mobile (able-to-move) communication devices such as vehicles and pedestrian user equipment (PUE) devices, as opposed to infrastructure devices, such as base stations, roadside units (RSUs), and servers.

Infrastructure Device—as used herein, may refer generally in the context of V2X systems to certain devices in a V2X system that are not user devices, and are not carried by traffic actors (i.e., pedestrians, vehicles, or other mobile users), but rather that facilitate user devices' participation in the V2X network. Infrastructure devices include base stations and roadside units (RSUs).

User Equipment (UE) (or "UE Device")—any of various types of computer systems devices which are mobile or portable and which perform wireless communications. Examples of UE devices include mobile telephones or smartphones (e.g., iPhone™, Android™-based phones), portable gaming devices (e.g., Nintendo DS™, PlayStation Portable™, Gameboy Advance™, iPhone™), laptops, wearable devices (e.g. smartwatch, smart glasses), PDAs, portable Internet devices, music players, data storage devices, or other handheld devices, etc. In general, the term "UE" or "UE device" can be broadly defined to encompass any electronic, computing, and/or telecommunications device (or combination of devices) which is easily transported by a user and capable of wireless communication.

Pedestrian UE (PUE) Device—a user equipment (UE) device as regarded in the context of V2X systems that may be worn or carried by various persons, including not only pedestrians in the strict sense of persons walking near roads, but also certain other peripheral or minor participants, or potential participants, in a traffic environment. These include stationary persons, persons not on vehicles who may not necessarily be near traffic or roads, persons jogging, running, skating, and so on, or persons on vehicles that may not substantially bolster the UE's power capabilities, such as bicycles, scooters, or certain motor vehicles.

Base Station—The term "Base Station" has the full breadth of its ordinary meaning, and at least includes a wireless communication station installed at a fixed location and used to communicate as part of a wireless telephone system or radio system.

Processing Element—refers to various elements or combinations of elements. Processing elements include, for example, circuits such as an ASIC (Application Specific Integrated Circuit), portions or circuits of individual processor cores, entire processor cores, individual processors, programmable hardware devices such as a field programmable gate array (FPGA), and/or larger portions of systems that include multiple processors.

Channel—a medium used to convey information from a sender (transmitter) to a receiver. It should be noted that since characteristics of the term "channel" may differ according to different wireless protocols, the term "channel" as used herein may be considered as being used in a manner that is consistent with the standard of the type of device with reference to which the term is used. In some standards, channel widths may be variable (e.g., depending on device capability, band conditions, etc.). For example, LTE may support scalable channel bandwidths from 1.4 MHz to 20 MHz. In contrast, WLAN channels may be 22 MHz wide while Bluetooth channels may be 1 Mhz wide. Other protocols and standards may include different definitions of channels. Furthermore, some standards may define and use multiple types of channels, e.g., different channels for uplink or downlink and/or different channels for different uses such as data, control information, etc.

FIG. 1—V2X Communication System

FIG. 1 illustrates an example vehicle-to-everything (V2X) communication system, according to some embodiments. It is noted that the system of FIG. 1 is merely one example of a possible system, and that features of this disclosure may be implemented in any of various systems, as desired.

Vehicle-to-everything (V2X) communication systems may be characterized as networks in which vehicles, UEs, and/or other devices and network entities exchange communications in order to coordinate traffic activity, among other possible purposes. V2X communications include communications conveyed between a vehicle (e.g., a wireless device or communication device constituting part of the vehicle, or contained in or otherwise carried along by the vehicle) and various other devices. V2X communications include vehicle-to-pedestrian (V2P), vehicle-to-infrastructure (V2I), vehicle-to-network (V2N), and vehicle-to-vehicle (V2V) communications, as well as communications between vehicles and other possible network entities or devices. V2X communications may also refer to communications between other non-vehicle devices participating in a V2X network for the purpose of sharing V2X-related information.

V2X communications may, for example, adhere to 3GPP Cellular V2X (C-V2X) specifications, or to one or more other or subsequent standards whereby vehicles and other devices and network entities may communicate. V2X communications may utilize both long-range (e.g., cellular) communications as well as short- to medium-range (e.g., non-cellular) communications. Cellular-capable V2X communications may be called Cellular V2X (C-V2X) communications. C-V2X systems may use various cellular radio access technologies (RATs), such as 4G LTE or 5G NR RATs. Certain LTE standards usable in V2X systems may be called LTE-Vehicle (LTE-V) standards.

As shown, the example V2X system includes a number of user devices. As used herein in the context of V2X systems, and as defined above, the term "user devices" may refer generally to devices that are associated with mobile actors or traffic participants in the V2X system, i.e., mobile (able-to-move) communication devices such as vehicles and pedestrian user equipment (PUE) devices. User devices in the example V2X system include the PUEs 104A and 104B and the vehicles 106A and 106B.

The vehicles 106 may constitute various types of vehicles. For example, the vehicle 106A may be a road vehicle or automobile, a mass transit vehicle, or another type of vehicle. The vehicles 106 may conduct wireless communications by various means. For example, the vehicle 106A may include communications equipment as part of the vehicle or housed in the vehicle, or may communicate through a wireless communications device currently contained within or otherwise carried along by the vehicle, such as a user equipment (UE) device (e.g., a smartphone or similar device) carried or worn by a driver, passenger, or other person on board the vehicle, among other possibilities. For simplicity, the term "vehicle" as used herein may include the wireless communications equipment which represents the vehicle and conducts its communications. Thus, for example, when the vehicle 106A is said to conduct wireless communications, it is understood that, more specifically, certain wireless communications equipment associated with and carried along by the vehicle 106A is performing the wireless communications.

The pedestrian UEs (PUEs) 104 may constitute various types of user equipment (UE) devices, i.e., portable devices capable of wireless communication, such as smartphones, smartwatches, etc., and may be associated with various types of users. Thus, the PUEs 104 are UEs, and may be referred to as UEs or UE devices. Note that although the UEs 104 may be referred to as PUEs (pedestrian UEs), they may not necessarily be carried by persons who are actively walking near roads or streets. PUEs may refer to UEs participating in a V2X system that are carried by stationary persons, by persons walking or running, or by persons on vehicles that may not substantially bolster the devices' power capabilities, such as bicycles, scooters, or certain motor vehicles. Note also that not all UEs participating in a V2X system are necessarily PUEs.

The user devices may be capable of communicating using multiple wireless communication standards. For example, the UE 104A may be configured to communicate using a wireless networking (e.g., Wi-Fi) and/or peer-to-peer wireless communication protocol (e.g., Bluetooth, Wi-Fi peer-to-peer, etc.) in addition to at least one cellular communication protocol (e.g., GSM, UMTS, LTE, LTE-A, LTE-V, HSPA, 3GPP2 CDMA2000, 5G NR, etc.). The UE 104A may also or alternatively be configured to communicate using one or more global navigational satellite systems (GNSS, e.g., GPS or GLONASS), one or more mobile television broadcasting standards (e.g., ATSC-M/H or DVB-H), and/or any other wireless communication protocol, if desired. Other combinations of wireless communication standards (including more than two wireless communication standards) are also possible.

As shown, certain user devices may be able to conduct communications with one another directly, i.e., without an intermediary infrastructure device such as base station 102A or RSU 110A. As shown, vehicle 106A may conduct V2X-related communications directly with vehicle 106B. Similarly, the vehicle 106B may conduct V2X-related communications directly with PUE 104B. Such peer-to-peer communications may utilize a "sidelink" interface such as the PC5 interface in the case of some LTE embodiments. In certain LTE embodiments, the PC5 interface supports direct cellular communication between user devices (e.g., between vehicles 106), while the Uu interface supports cellular communications with infrastructure devices such as base stations. The LTE PC5/Uu interfaces are used only as an example, and PC5 as used herein may represent various other possible wireless communications technologies that allow for direct sidelink communications between user devices, while Uu in turn may represent cellular communications conducted between user devices and infrastructure devices, such as base stations. Some user devices in a V2X system, e.g., PUE 104A, may be unable to perform sidelink communications, e.g., because they lack certain hardware necessary to perform such communications.

As shown, the example V2X system includes a number of infrastructure devices in addition to the above-mentioned user devices. As used herein, "infrastructure devices" in the context of V2X systems refers to certain devices in a V2X system which are not user devices, and are not carried by traffic actors (i.e., pedestrians, vehicles, or other mobile users), but rather which facilitate user devices' participation in the V2X network. The infrastructure devices in the example V2X system include base station 102A and roadside unit (RSU) 110A.

The base station (BS) 102A may be a base transceiver station (BTS) or cell site (a "cellular base station"), and may include hardware that enables wireless communication with user devices, e.g., with the user devices 104A and 106A.

The communication area (or coverage area) of the base station may be referred to as a "cell" or "coverage". The base station 102A and user devices such as PUE 104A may be configured to communicate over the transmission medium using any of various radio access technologies (RATs), also referred to as wireless communication technologies, or telecommunication standards, such as GSM, UMTS, LTE, LTE-Advanced (LTE-A), LTE-Vehicle (LTE-V), HSPA, 3GPP2 CDMA2000, 5G NR, etc. Note that if the base station 102A is implemented in the context of LTE, it may alternately be referred to as an eNodeB', or eNB.

As shown, the base station 102A may also be equipped to communicate with a network 100 (e.g., the V2X network, as well as a core network of a cellular service provider, a telecommunication network such as a public switched telephone network (PSTN), and/or the Internet, among various possibilities). Thus, the base station 102A may facilitate communication between user devices and/or between user devices and the network 100. The cellular base station 102A may provide user devices, such as UE 104A, with various telecommunication capabilities, such as voice, SMS and/or data services. In particular, the base station 102A may provide connected user devices, such as UE 104A and vehicle 106A, with access to the V2X network.

Thus, while the base station 102A may act as a "serving cell" for user devices 104A and 106A as illustrated in FIG. 1, the user devices 104B and 106B may also be capable of communicating with the base station 102A. The user devices shown, i.e., user devices 104A, 104B, 106A, and 106B may also be capable of receiving signals from (and may possibly be within communication range of) one or more other cells (which might be provided by base stations 102B-N and/or any other base stations), which may be referred to as "neighboring cells". Such cells may also be capable of facilitating communication between user devices and/or between user devices and the network 100. Such cells may include "macro" cells, "micro" cells, "pico" cells, and/or cells which provide any of various other granularities of service area size. For example, base stations 102A-B illustrated in FIG. 1 might be macro cells, while base station 102N might be a micro cell. Other configurations are of course also possible.

Roadside unit (RSU) 110A constitutes another infrastructure device usable for providing certain user devices with access to the V2X network. RSU 110A may be one of various types of devices, such as a base station, e.g., a transceiver station (BTS) or cell site (a "cellular base station"), or another type of device that includes hardware that enables wireless communication with user devices and facilitates their participation in the V2X network.

RSU 110A may be configured to communicate using one or more wireless networking communication protocols (e.g., Wi-Fi), cellular communication protocols (e.g., LTE, LTE-V, etc.), and/or other wireless communication protocols. In some embodiments, RSU 110A may be able to communicate with devices using a "sidelink" technology such as LTE PC5.

RSU 110A may communicate directly with user devices, such as the vehicles 106A and 106B as shown. RSU 110A may also communicate with the base station 102A. In some cases, RSU 110A may provide certain user devices, e.g., vehicle 106B, with access to the base station 102A. While RSU 110A is shown communicating with vehicles 106, it may also (or otherwise) be able to communicate with PUEs 104. Similarly, RSU 110A may not necessarily forward user device communications to the base station 102A. In some embodiments, the RSU 110A and may constitute a base station itself, and/or may forward communications to the server 120.

The server 120 constitutes a network entity of the V2X system, as shown, and may be referred to as a cloud server. Base station 102A and/or RSU 110A may relay certain V2X-related communications between the user devices 104 and 106 and the server 120. The server 120 may be used to process certain information collected from multiple user devices, and may administer V2X communications to the user devices in order to coordinate traffic activity. In various other embodiments of V2X systems, various functions of the cloud server 120 may be performed by an infrastructure device such as the base station 102A or RSU 110A, performed by one or more user devices, and/or not performed at all.

Figure 2:
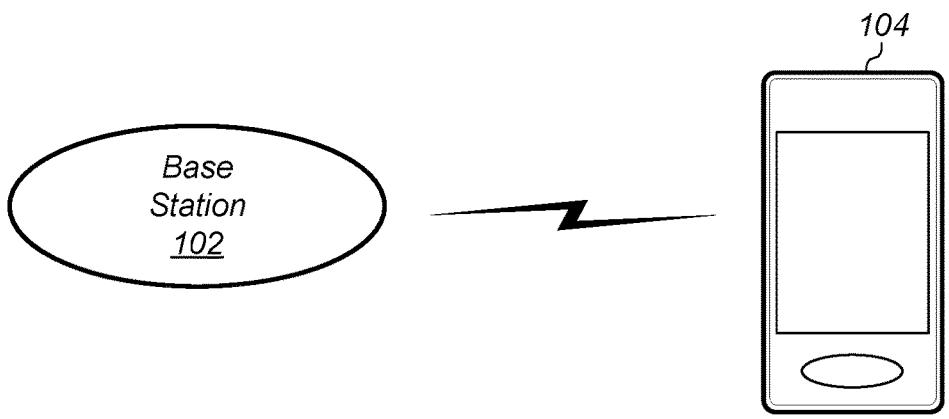
FIG. 2 illustrates a base station in communication with a user equipment (UE) device, according to some embodiments.

FIG. 2—Communication Between a UE and Base Station

FIG. 2 illustrates a user equipment (UE) device 104 (e.g., one of the PUEs 104A or 104B in FIG. 1) in communication with a base station 102 (e.g., the base station 102A in FIG. 1), according to some embodiments. The UE 104 may be a device with cellular communication capability such as a mobile phone, a hand-held device, a computer or a tablet, or virtually any type of portable wireless device.

The UE 104 may include a processor that is configured to execute program instructions stored in memory. The UE 104 may perform any of the method embodiments described herein by executing such stored instructions. Alternatively, or in addition, the UE 104 may include a programmable hardware element such as an FPGA (field-programmable gate array) that is configured to perform any of the method embodiments described herein, or any portion of any of the method embodiments described herein.

The UE 104 may include one or more antennas for communicating using one or more wireless communication protocols or technologies. In some embodiments, the UE 104 may be configured to communicate using, for example, CDMA2000 (1×RTT/1×EV-DO/HRPD/eHRPD) or LTE using a single shared radio and/or GSM or LTE using the single shared radio. The shared radio may couple to a single antenna, or may couple to multiple antennas (e.g., for MIMO) for performing wireless communications. In general, a radio may include any combination of a baseband processor, analog RF signal processing circuitry (e.g., including filters, mixers, oscillators, amplifiers, etc.), or digital processing circuitry (e.g., for digital modulation as well as other digital processing). Similarly, the radio may implement one or more receive and transmit chains using the aforementioned hardware. For example, the UE 104 may share one or more parts of a receive and/or transmit chain between multiple wireless communication technologies, such as those discussed above.

In some embodiments, the UE 104 may include separate transmit and/or receive chains (e.g., including separate antennas and other radio components) for each wireless communication protocol with which it is configured to communicate. As a further possibility, the UE 104 may include one or more radios which are shared between multiple wireless communication protocols, and one or more radios which are used exclusively by a single wireless communication protocol. For example, the UE 104 might include a shared radio for communicating using either of LTE or 1×RTT (or LTE or GSM), and separate radios for communicating using each of Wi-Fi and Bluetooth. Other configurations are also possible.

Figure 3:
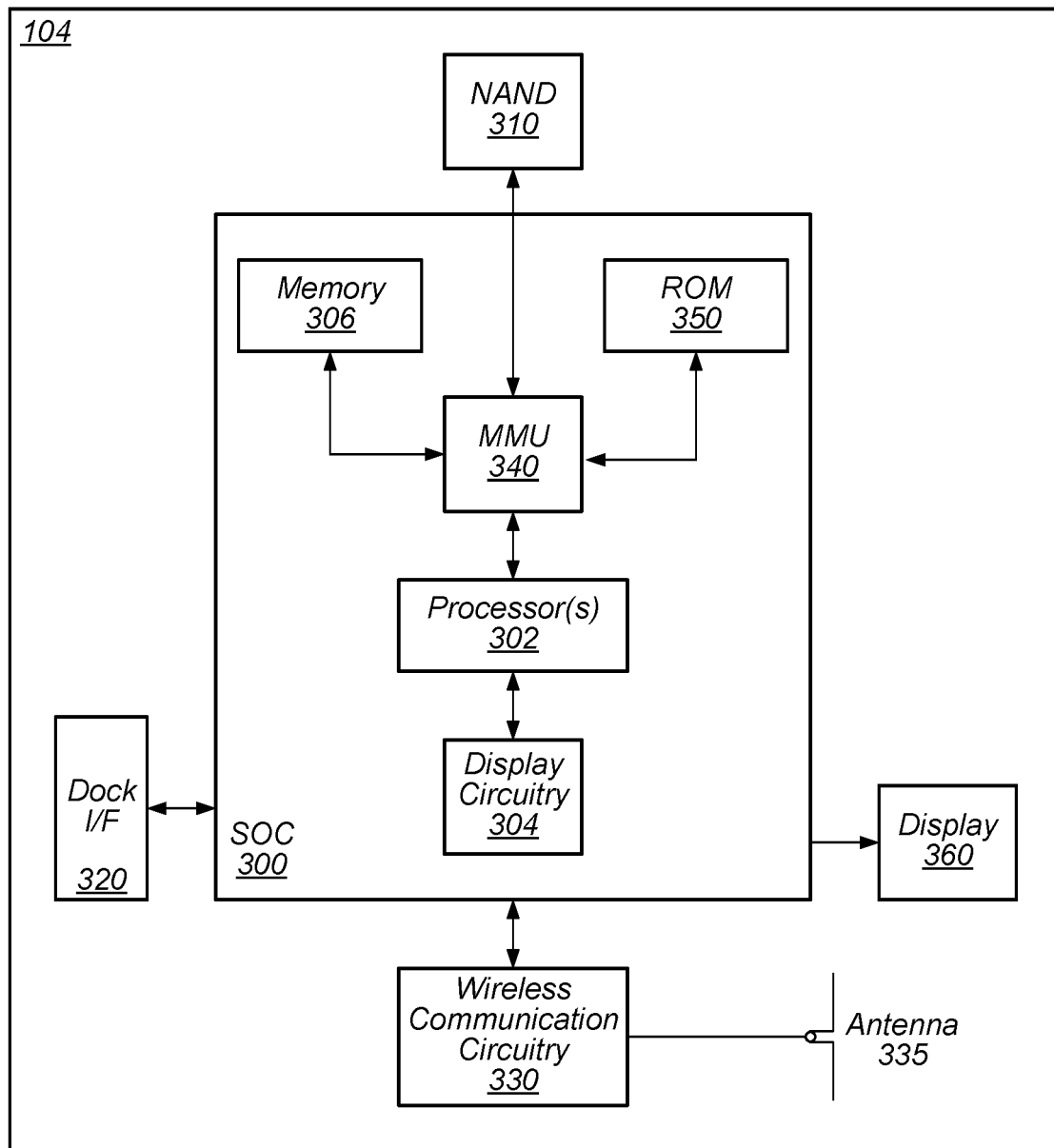
FIG. 3 is an example block diagram of a UE, according to some embodiments.

FIG. 3—Block Diagram of a UE

FIG. 3 illustrates an example block diagram of a UE 104, according to some embodiments. As shown, the UE 104 may include a system on chip (SOC) 300, which may include portions for various purposes. For example, as shown, the SOC 300 may include processor(s) 302 which may execute program instructions for the UE 104 and display circuitry 304 which may perform graphics processing and provide display signals to the display 360. The processor(s) 302 may also be coupled to memory management unit (MMU) 340, which may be configured to receive addresses from the processor(s) 302 and translate those addresses to locations in memory (e.g., memory 306, read only memory (ROM) 350, NAND flash memory 310) and/or to other circuits or devices, such as the display circuitry 304, wireless communication circuitry 330, connector I/F 320, and/or display 360. The MMU 340 may be configured to perform memory protection and page table translation or set up. In some embodiments, the MMU 340 may be included as a portion of the processor(s) 302.

As shown, the SOC 300 may be coupled to various other circuits of the UE 104. For example, the UE 104 may include various types of memory (e.g., including NAND flash memory 310), a connector interface 320 (e.g., for coupling to a computer system, dock, charging station, etc.), the display 360, and wireless communication circuitry 330 (e.g., for LTE, LTE-A, LTE-V, 5G NR, CDMA2000, Bluetooth, Wi-Fi, GPS, etc.). The UE may also include at least one SIM device, and may include two SIM devices, each providing a respective international mobile subscriber identity (IMSI) and associated functionality.

As shown, the UE device 104 may include at least one antenna (and possibly multiple antennas, e.g., for MIMO and/or for implementing different wireless communication technologies, among various possibilities) for performing wireless communication with base stations, access points, and/or other devices. For example, the UE device 104 may use antenna 335 to perform the wireless communication.

The UE 104 may also include and/or be configured for use with one or more user interface elements. The user interface elements may include any of various elements, such as display 360 (which may be a touchscreen display), a keyboard (which may be a discrete keyboard or may be implemented as part of a touchscreen display), a mouse, a microphone and/or speakers, one or more cameras, one or more buttons, and/or any of various other elements capable of providing information to a user and/or receiving or interpreting user input.

As described herein, the UE 104 may include hardware and software components for implementing features for performing more efficient vehicle-related communication, such as those described herein. The processor 302 of the UE device 104 may be configured to implement part or all of the methods described herein, e.g., by executing program instructions stored on a memory medium (e.g., a non-transitory computer-readable memory medium). In other embodiments, processor 302 may be configured as a programmable hardware element, such as an FPGA (Field Programmable Gate Array), or as an ASIC (Application Specific Integrated Circuit). Alternatively (or in addition)

the processor 302 of the UE device 104, in conjunction with one or more of the other components 300, 304, 306, 310, 320, 330, 335, 340, 350, 360 may be configured to implement part or all of the features described herein, such as the features described herein.

Figure 4:
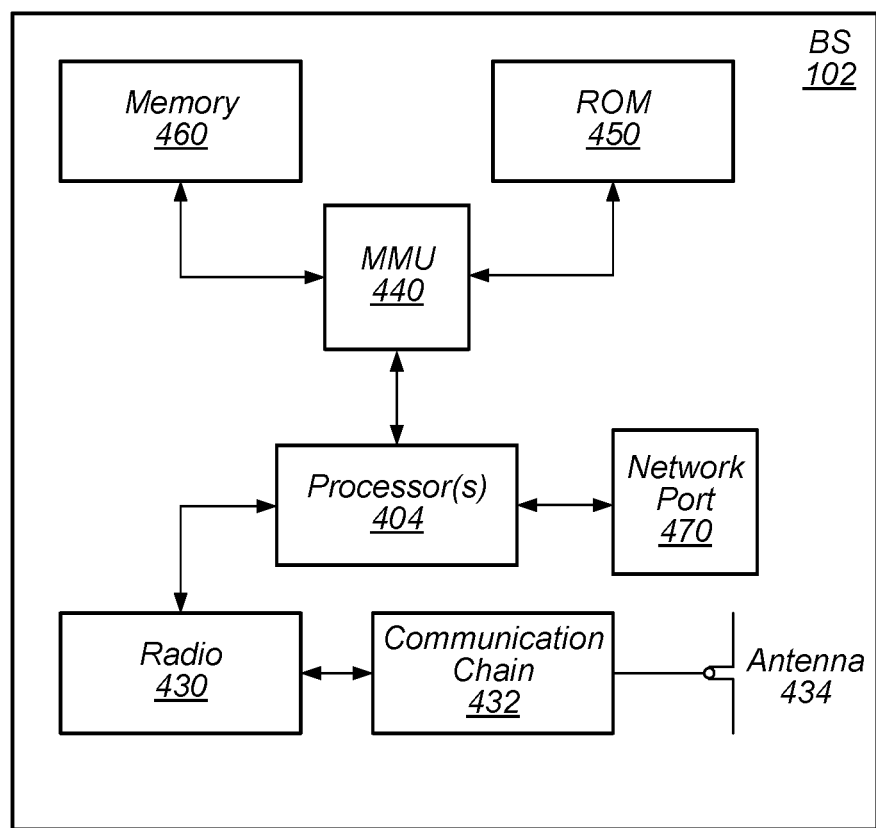
FIG. 4 is an example block diagram of a base station, according to some embodiments.

FIG. 4—Block Diagram of a Base Station

FIG. 4 illustrates an example block diagram of a base station 102 (e.g., base station 102A in FIG. 1), according to some embodiments. It is noted that the base station of FIG. 4 is merely one example of a possible base station. As shown, the base station 102 may include processor(s) 404 which may execute program instructions for the base station 102. The processor(s) 404 may also be coupled to memory management unit (MMU) 440, which may be configured to receive addresses from the processor(s) 404 and translate those addresses to locations in memory (e.g., memory 460 and read only memory (ROM) 450) or to other circuits or devices.

The base station 102 may include at least one network port 470. The network port 470 may be configured to couple to a telephone network and provide a plurality of devices, such as UE devices 104, access to the telephone network The network port 470 (or an additional network port) may also or alternatively be configured to couple to a cellular network, e.g., a core network of a cellular service provider. The core network may provide mobility related services and/or other services to a plurality of devices, such as UE devices 104. In some cases, the network port 470 may couple to a telephone network via the core network, and/or the core network may provide a telephone network (e.g., among other UE devices serviced by the cellular service provider).

The base station 102 may include at least one antenna 434, and possibly multiple antennas. The at least one antenna 434 may be configured to operate as a wireless transceiver and may be further configured to communicate with UE devices 104 via radio 430. The antenna 434 communicates with the radio 430 via communication chain 432. Communication chain 432 may be a receive chain, a transmit chain or both. The radio 430 may be configured to communicate via various wireless communication standards, including, but not limited to, LTE, LTE-A, LTE-V, GSM, UMTS, CDMA2000, 5G NR, Wi-Fi, etc.

The base station 102 may be configured to communicate wirelessly using multiple wireless communication standards. In some instances, the base station 102 may include multiple radios, which may enable the base station 102 to communicate according to multiple wireless communication technologies. For example, as one possibility, the base station 102 may include an LTE radio for performing communication according to LTE as well as a Wi-Fi radio for performing communication according to Wi-Fi. In such a case, the base station 102 may be capable of operating as both an LTE base station and a Wi-Fi access point. As another possibility, the base station 102 may include a multi-mode radio which is capable of performing communications according to any of multiple wireless communication technologies (e.g., LTE and Wi-Fi, LTE and UMTS, LTE and CDMA2000, UMTS and GSM, etc.).

As described further subsequently herein, the BS 102 may include hardware and software components for implementing or supporting implementation of features described herein. The processor 404 of the base station 102 may be configured to implement or support implementation of part or all of the methods described herein, e.g., by executing program instructions stored on a memory medium (e.g., a non-transitory computer-readable memory medium). Alternatively, the processor 404 may be configured as a programmable hardware element, such as an FPGA (Field Programmable Gate Array), or as an ASIC (Application Specific Integrated Circuit), or a combination thereof. Alternatively (or in addition) the processor 404 of the BS 102, in conjunction with one or more of the other components 430, 432, 434, 440, 450, 460, 470 may be configured to implement or support implementation of part or all of the features described herein.

Safety Message Communications by Resource-Constrained UEs

In some embodiments of a V2X system, user devices in the V2X system (e.g., vehicles and/or PUEs), may send routine messages to the V2X network (or to other devices in the network) usable for coordinating traffic activity, including averting collisions, among other purposes. These "safety messages" may include various data, such as movement information (e.g., speed, acceleration, and/or brake status), position or location information (e.g., latitude and longitude, elevation, etc.), and other details. In some embodiments, safety messages may be Basic Safety Messages (BSMs), and may adhere to a BSM format. An example safety message format is described further below with regard to FIG. 10.

User devices in the V2X system may periodically transmit safety messages with a relatively high frequency, as well as to actively monitor for incoming safety messages from other devices. Such active communications may consume device resources, e.g., power, at a relatively high rate.

This potentially high resource usage and potentially high rate of power consumption may heavily burden certain devices participating in the V2X system. This high resource usage may be less of a concern for infrastructure devices such as base stations and roadside units (RSUs), which may have extensive resource and power capabilities, e.g., which are not battery-powered. Similarly, it may be less of a concern for certain vehicle devices, which may also have access to extensive power capabilities. However, the potentially high power consumption of frequently communicating safety messages and performing other V2X communications may overburden certain handheld or portable battery-powered devices participating in the V2X network, i.e., certain user equipment (UE) devices. UEs in the V2X system may be UEs carried or worn by pedestrians or other persons, where the term pedestrian UE (PUE) includes UEs carried by persons who may be stationary, walking, running, cycling, etc., as described above. Hence, for V2X systems that involve UEs, which are generally resource-limited, and particularly PUEs, improved communication techniques may be desired.

Figure 5:
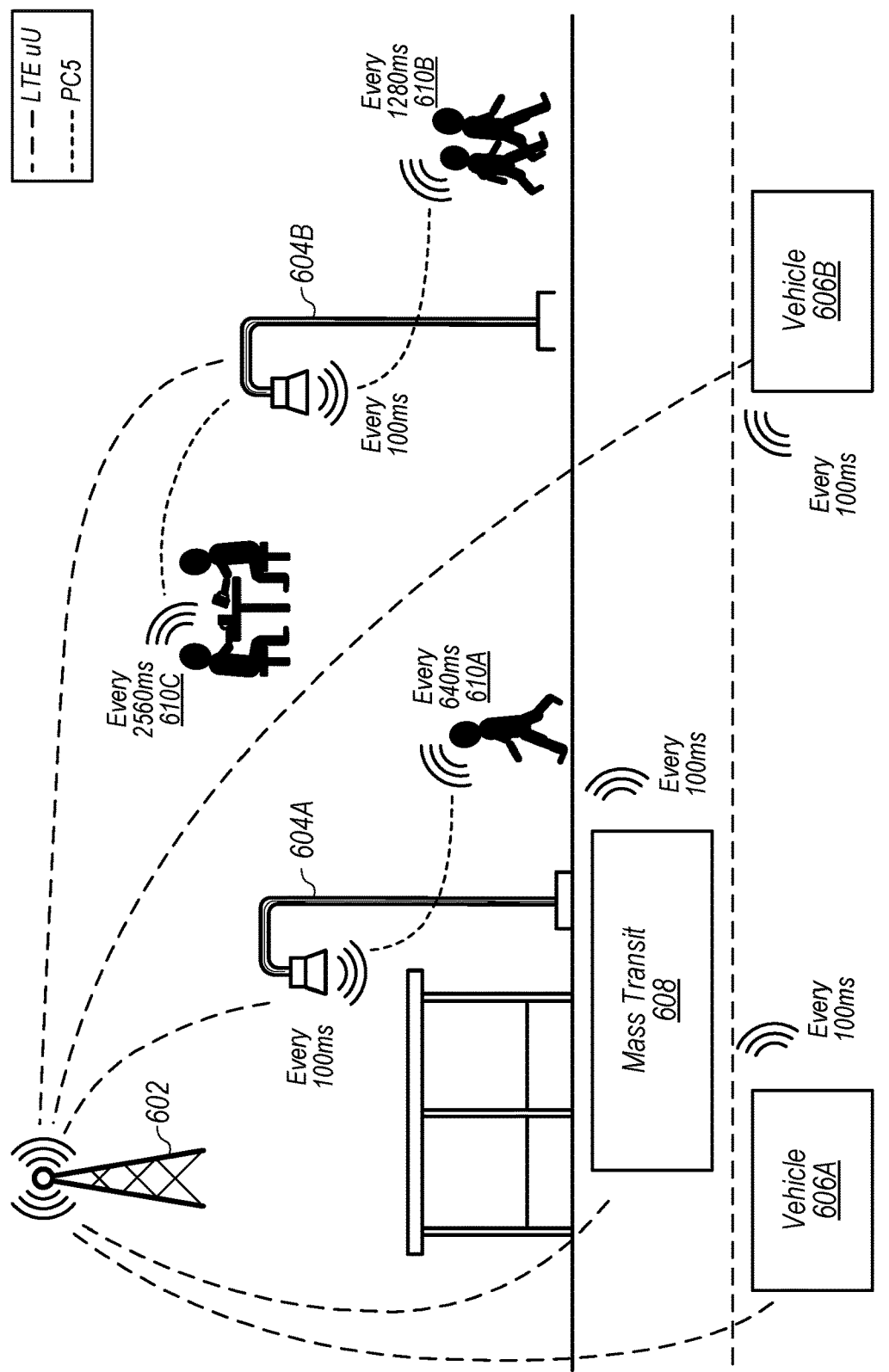
FIG. 5 illustrates an example V2X system with improved scheduling of safety message communications, according to some embodiments.
Figure 6:
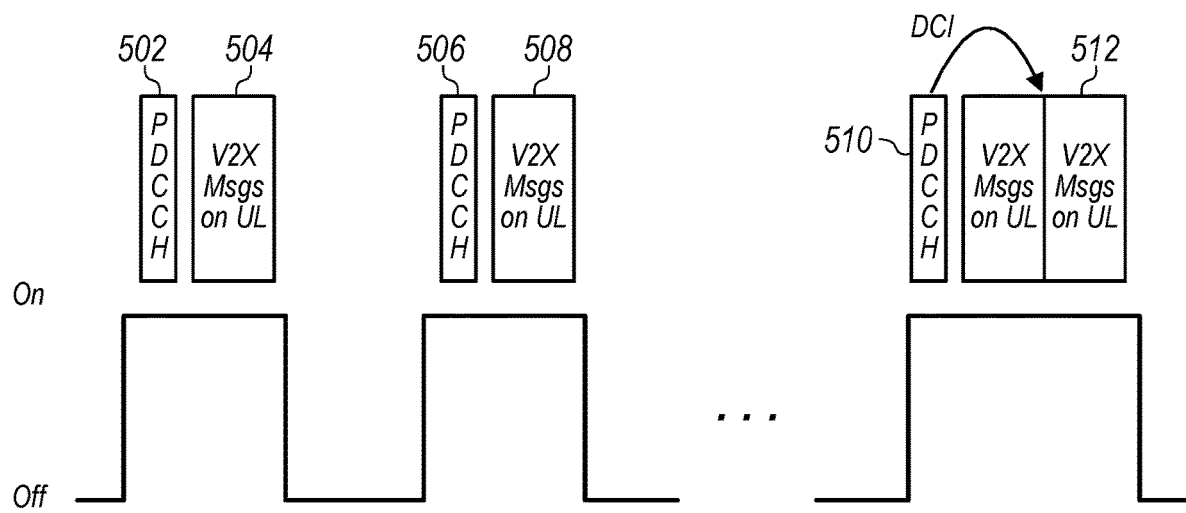
FIG. 6 illustrates an improved safety message transmission schedule for one or more UEs in a V2X system, according to some embodiments.

FIGS. 5 & 6—PUE Safety Message Scheduling Proximate to PUE Wake-Up Instances

FIG. 5 depicts an example V2X network with improved scheduling of safety message communications. The network comprises various infrastructure devices, including roadside units (RSUs) 604A and 604B and a base station 602. Shown participating in the network are also various user devices, including vehicles 606A and 606B, a mass transit vehicle 608, and UEs carried by pedestrians (and other persons), i.e., PUEs, shown at 610A, 610B, and 610C.

The user devices in the V2X network may communicate with various other devices in the network through various channels. For example, as shown, the vehicles 606 and 608 may communicate directly with the base station 602 via a cellular interface, such as LTE uU in the case of certain LTE V2X embodiments. The PUEs 610 may communicate to the RSUs 604, which may in turn communicate with the base station 602. Thus, in some embodiments, the base station 602 may communicate to the PUEs 610 through the RSUs 604, as shown. In some embodiments, the PUEs 610 may communicate to the RSUs 604 via sidelink channels. For example, in certain LTE V2X embodiments the PUEs 610 may communicate with the RSUs 604 via the PC5 interface, and may be operating in Mode 1, whereby sidelink V2X transmissions may be scheduled by the network. In some embodiments, the PUEs 610 may be in the coverage area of the base station 602.

As described above, the user devices in the V2X system, e.g., the vehicles 606 and 608 and the PUEs 610, may frequently transmit and receive certain routine V2X communications, i.e., safety messages, through the V2X network. These frequent safety message communications may strain power-limited UE devices, e.g., the PUEs 610.

In some embodiments, the V2X network may operate to reduce power consumed by certain UEs, e.g., the PUEs 610, by improving the timing and/or adjusting and reducing the frequency (i.e., "periodicity") of safety message communications. For example, the network may operate to schedule transmissions and receptions of safety messages by PUE 610A (or other PUEs) in such a way as to better conserve its power and resources.

In some embodiments, the network may schedule safety message transmission resources for a group of one or more UEs into time windows proximate to the UEs' wake-up times. UEs in the V2X system may be operating in a DRX (discontinuous reception) state in order to conserve their resources. According to DRX, the UEs may cycle between sleep and awake states, discontinuously monitoring for and performing communications. In various cases, UEs may be operating according to connected mode DRX (CDRX) or inactive/idle mode DRX.

If safety message transmissions are scheduled proximate (or near) the wake-up times of one or more UEs, safety message communications (which may include transmissions and/or receptions) may be accommodated in the "on" or "awake" windows, and the UEs may not need to perform additional wake-ups to communicate safety messages. By reducing additional wake-ups, this approach may tend to conserve the UEs' resources. As used herein, the term "proximate" refers to the notion that the safety message communications are sufficiently close to the wake-up time such that these safety message communications will be performed relatively soon after the wake-up time has occurred, or sufficiently close to the wake-up such that the safety message communication will be virtually guaranteed to occur prior to the next sleep state.

FIG. 6 illustrates some embodiments of a safety message transmission schedule for one or more UEs in a V2X system, such as the PUEs 610 in FIG. 5. As shown, the one or more UEs ("the group of UEs") are operating according to DRX and may cycle between sleep and awake states, i.e., "on" and "off" states. In some embodiments, multiple groups of UEs sharing transmission schedules may coexist in the network and communicate with the network via their respective group channels. Various criteria may be used to determine how UEs are allocated into groups, such as the location, speed, DRX schedules, or power capabilities of the UEs.

At 502, 506, and 510, the network, e.g., the base station 602 in FIG. 5, may communicate to the group of UEs via a group channel at periodic intervals. For example, the network (or specifically, e.g., the base station 602) may communicate uplink scheduling information for transmitting safety messages to the group of UEs via a group physical downlink control channel (PDCCH). In some cases, network transmissions of scheduling information to the group of UEs may include a downlink control information (DCI) field reserved for V2X-related information, as shown at 510. This DCI field may indicate aperiodic transmission of safety messages, and may establish a new window for communicating safety messages, as shown at 512.

In some embodiments, the group of one or more UEs (e.g., the PUEs 610 in FIG. 5) in the coverage area of the base station may be scheduled to simultaneously transmit safety messages proximate to their DRX (CDRX or inactive/idle DRX) wake-up instances. The group of UEs may use the physical uplink shared channel (PUSCH) to transmit their respective safety messages to the network. In some embodiments, the group of UEs may communicate safety messages according to a multiplexing approach, such as time division multiplexing (TDM), frequency division multiplexing (FDM), or code division multiplexing (CDM), so that their respective transmissions may be correctly distinguished and interpreted by the network, e.g., by the base station 602.

According to some embodiments, the frequency (i.e., "periodicity") of safety message communications sent from certain UEs or certain groups of UEs may be adjusted or reduced to further conserve UE resources.

In some embodiments, a UE may send safety messages with a certain default frequency, e.g., at a certain highest baseline frequency of once per period, wherein the period may be a time interval defined by the V2X network. Adjustments to the UE's safety message transmission frequency may constitute adjustments to the number of periods skipped in-between periods in which the UE does make transmissions. In some embodiments, the baseline transmission period defined by the network may coincide with or adhere to a DRX cycle period of one or more user devices in the network, or a multiple of the DRX cycle period, so that communications of safety messages in a given period coincide with DRX wake-up times as described above.

Adjustments to the frequency with which safety messages are transmitted by a UE may be determined by various criteria, such as the indicated degree of movement being experienced by the UE (e.g., mobility state) and/or the indicated power limitations of the UE. In varying embodiments, the base station 602, the UE itself, and/or other network entities may determine or participate in determining adjustments of the UE's safety message communications for the purpose of power-saving in the UE.

For example, a UE in the V2X network shown at FIG. 5, such as PUE 610A, may be determined to be relatively fast-moving (i.e., in a high mobility state) and/or not power limited (power-capable). In response, the network, e.g., the base station 602 (and/or RSUs 604) may communicate safety message scheduling information to the PUE 610A indicating that it should transmit safety messages at a higher frequency or at a certain highest baseline frequency for UE transmissions of once per period, e.g., once every 640 ms period as shown. In some embodiments, the transmission times at the end of each period may coincide with at least a fraction of the UE's DRX wake-up times.

As another example, PUE 610B may be determined to have a certain low battery power or to be power-limited to a certain degree, as might be the case if the UE is a relatively power-limited device such as a power-limited smartwatch. In this case, the network may communicate safety message scheduling information to the PUE 610B indicating that it should reduce the frequency of safety message transmissions in order to conserve its power. For example, if PUE 610B had been scheduled to transmit safety messages at the example baseline UE safety message frequency of every 640 ms, the base station may indicate that the UE should reduce the frequency of its transmissions to one message for every two of these 640 ms periods, so that the UE transmits a new safety message every 1280 ms, as shown.

As another example, PUE 610C may be determined to be static or motionless to a certain degree (i.e., in a low mobility state), e.g., based on movement position information contained in its prior safety messages. Based on this determination and other possible factors, such as the UE's power level, the network may determine that the UE's safety message transmission frequency should be reduced. For example, transmissions may be reduced to once every four periods, i.e., from every 640 ms to every 2560 ms, as shown. In this example, the UE may broadcast safety messages only once during a period of time in which it may have transmitted four messages at its prior baseline frequency. Such an adjustment may tend to greatly conserve the UE's power.

In some embodiments, the PUE 610C (which may be determined to be relatively static) may cease safety message transmissions altogether until its motion state changes significantly, e.g., until measurements related to its speed, position, and/or direction indicate a greater degree of movement. The duration of time in which the UE may perform no transmissions may be limited to a certain minimum frequency, i.e., to a maximum amount of time (e.g., one second) in which the UE is allowed to pause transmissions and at the end of which the UE may be expected to perform further safety message communications.

In some embodiments, the V2X network may substitute (or interpolate) safety message information to represent a UE that has not transmitted a safety message in a given period (e.g., because its transmission frequency had been reduced as describe above), or for which no safety message has been received in a given period. For example, PUE 610C may not transmit a safety message for a certain current period (e.g., the current 640 ms period) because its frequency has been reduced (e.g., to once every two periods, or every 1280 ms). Hence, devices that may otherwise receive the UE's safety messages, such as RSU 604B, and/or base station 602, may detect no safety message from the UE in the current period. In this case, the network may construct substitute safety message information to communicate to other devices in the current period. For example, RSU 604B or base station 602 may communicate position information and/or other safety message information interpolated or copied from the UE's prior safety messages to other devices in the network for the current period, in lieu of information that may otherwise have been received directly from PUE 610C in that period.

In some embodiments, the frequency of a certain UE's safety message transmissions may be returned to a highest baseline frequency or otherwise increased according to certain criteria. For example, if PUE 610C indicates increased motion or a transition to a higher mobility state, e.g., due its user having begun walking, the network may indicate that it should increase its frequency, e.g., to the baseline frequency, i.e., to once every 640 ms period.

In some embodiments, more power-capable devices, such as vehicles and infrastructure devices, may communicate safety messages with one or more different, higher frequencies than more power-constrained devices, such as PUEs. For example, the vehicles 606 and 608 and RSUs 604 may communicate safety messages at 100 ms intervals, as shown.

Figure 7:
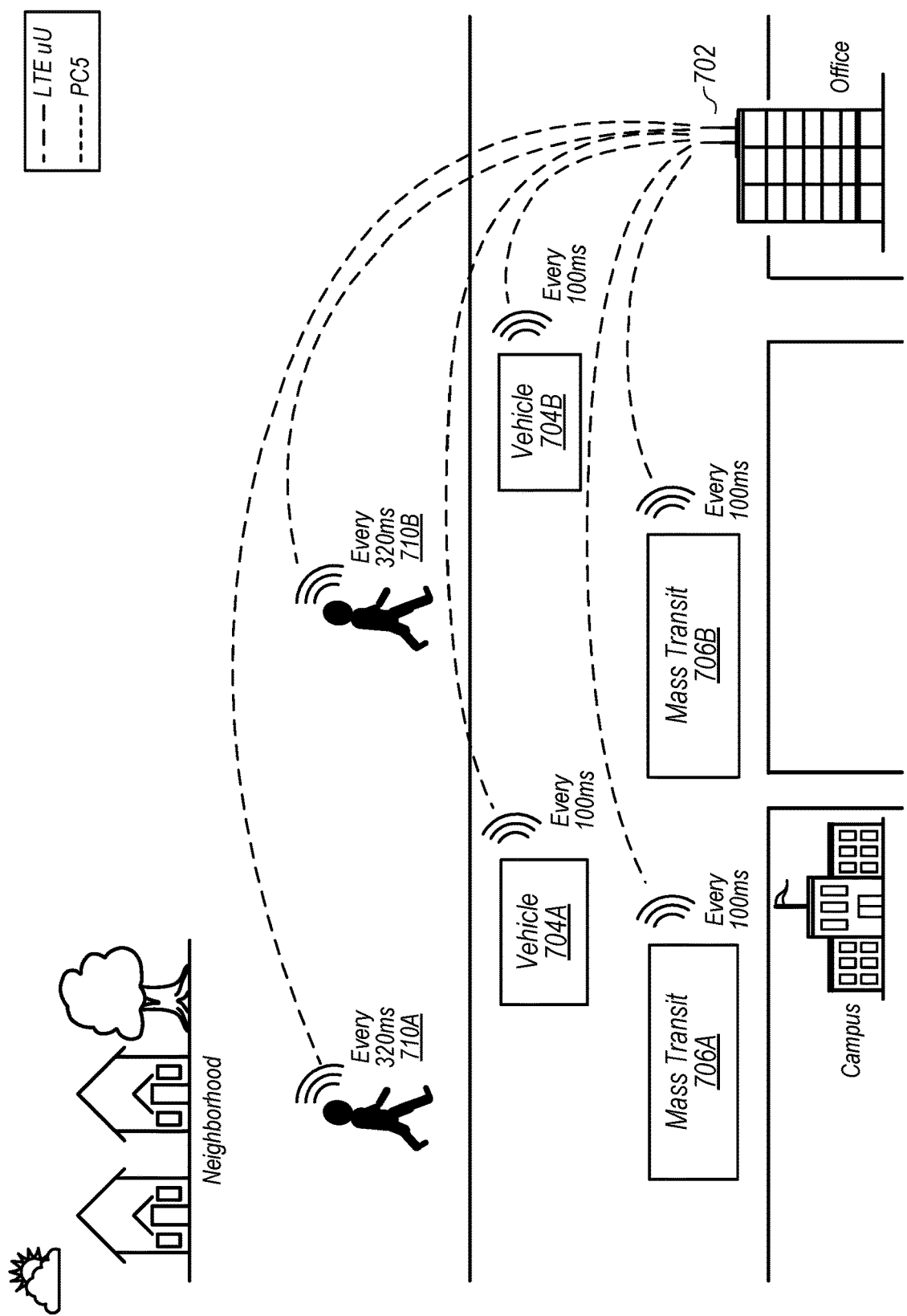
FIG. 7 illustrates a V2X network in a relatively high state of activity with improved scheduling of safety messages, according to some embodiments.
Figure 8:
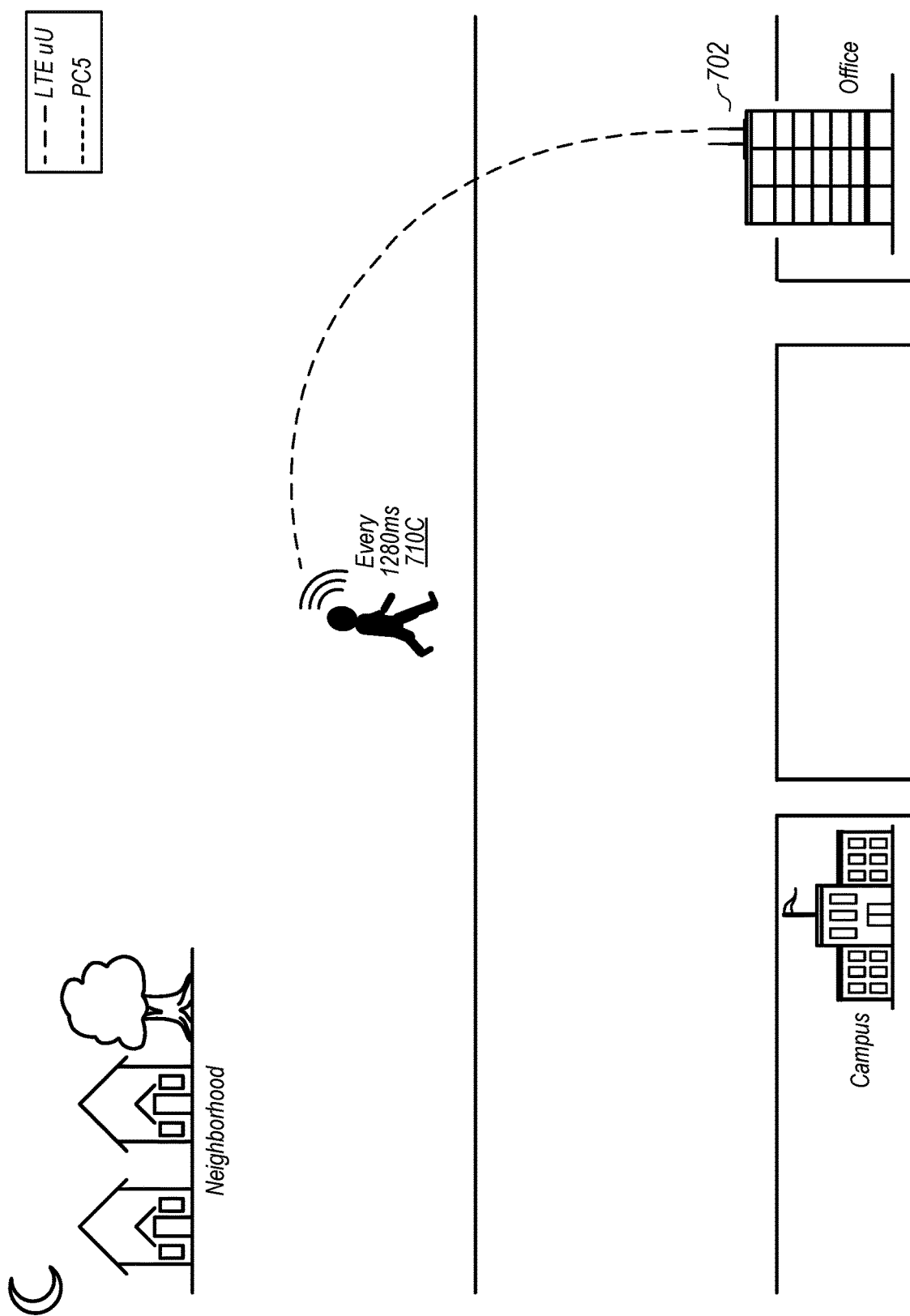
FIG. 8 illustrates a V2X network in a relatively low state of activity with improved scheduling of safety messages, according to some embodiments.

FIGS. 7 & 8—PUE Safety Message Scheduling Based on Area Activity

FIGS. 7 & 8 show a V2X network environment in different states of activity. User devices in the network, which include pedestrian UEs (PUEs) 710, vehicles 704, and mass transit vehicles 706, may communicate to the network via an infrastructure device, e.g., a base station (or RSU) 702.

In some embodiments, the V2X network may operate to adjust safety message scheduling for a group of user devices in the network based on overall activity in the network or in a certain area in the network coverage. For example, the base station (or RSU) 702 may communicate information specifying new safety message transmission scheduling to the two PUEs 710 at least partly based on aggregated or statistical activity and/or movement (i.e., mobility) metrics received from (or derived from) one or more (or all) user devices in the coverage or in an area within the coverage (i.e., "the area") of the base station 702.

User devices, e.g., vehicles 706 and PUEs 710, may communicate their respective activity, movement, and/or location data to the network by various means. In some embodiments, this data may be obtained through the devices' respective safety message communications. The network, e.g., the base station 702, may receive activity or movement data from one or more user devices through direct transmission by the respective devices, or via communications from the devices relayed through other intermediary devices, e.g., via a sidelink channel.

Various values related to overall activity in the area may be considered by the network e.g., by the base station 702, in determining message scheduling. Statistics related to the speeds of user devices may be considered, such as average speed or maximum speed values for certain groups of user devices, or the ratio of devices in a certain group whose current or past speeds are greater than a threshold value. Various other activity-related, movement-related, or speed-related data may be used, such as overall traffic volume measurements, among other information.

For example, in the scenario depicted in FIG. 7, the network or area may be determined to be in a relatively more active state. In this scenario, there may be a relatively high degree of road traffic and/or pedestrian traffic, or, for example, the vehicles 704 may be determined to be moving at relatively high speeds. As a result of determining this high activity state or motion/mobility state, the base station 702 may establish the safety message transmission scheduling of certain UEs at a high or higher frequency. For example, the base station 702 may communicate information to the PUEs 710 indicating that they should transmit at a highest baseline frequency of once per period, e.g., once every 320 ms period as shown. This more frequent transmission of safety messages may serve to more promptly update the network of the PUEs' users' activity, so that the network may more aptly coordinate traffic in a relatively more dynamic traffic environment.

In some embodiments, the safety message transmission frequency of more resource-capable devices, such as vehicles, infrastructure devices, and certain more power-capable UEs, may not necessarily be adjusted or reduced based on overall activity, since the more extensive resources of such devices may comfortably sustain high-frequency communications. For example, vehicles 704 and mass transit vehicles 706 may communicate at constant frequencies, e.g., every 100 ms as shown, regardless of certain traffic and movement conditions.

In the scenario depicted in FIG. 7, the area may be determined to be in a relatively more static or inactive state. For example, there may be relatively little or no vehicle activity as shown. In such cases, the network may indicate to certain power-limited UEs that they should reduce the frequency of their safety message transmissions in order to conserve power. For example, the base station (or RSU) 702 may communicate scheduling information to PUE 710C indicating that it should reduce the frequency of its transmissions to one every four 320 ms periods, i.e., to every 1280 ms, as shown. Here, the UE may benefit from resource conservation without overly compromising the efficacy of the V2X system in light of the environment's low activity.

In some embodiments, a user device such as a PUE that has recently joined the network or is new to an area within the network, e.g., that is new to the coverage area of the base station 702, may initially begin transmissions of safety messages at a certain higher baseline frequency by default. Here, the base station 702 may later adjust the frequency of the new UE's communications after collecting a certain amount of information regarding its activity, such as several consecutive motion- or position-related measurements.

Out-of-Coverage UE Safety Message Scheduling

In some cases, user devices may be unable to communicate directly with certain infrastructure devices in a V2X network, but may still participate in the V2X network. For example, a UE, which may be a PUE, (and which by definition is portable and resource-constrained) may be outside of a certain cellular coverage area or unable to communicate with a base station that may be managing or participating in the V2X network. In other words, the UE may be "out of coverage". Here, in the case of some C-V2X embodiments using 5G NR, the UE may be unable to perform V2X-related communications with the base station via the uU cellular interface.

According to some embodiments, the UE may participate in the V2X network by communicating over direct sidelink channels with other devices participating in the network, such as other user devices (e.g., PUEs or vehicles) or certain infrastructure devices (e.g., RSUs). For example, in some LTE-based cellular V2X embodiments, these sidelink communications may utilize the PC5 interface.

As a participant in the V2X network, the UE may periodically transmit and receive safety messages. Frequent safety message communications may strain the UE's resources, as described above. Additionally, if the UE is communicating via sidelink with one or more other user devices, some of which may also be UEs (that are power-limited), these V2X-related sidelink communications may also strain the resources of these one or more other user devices. Furthermore, in some cases, frequent communications of safety messages may promote radio frequency (RF) pollution, which may interfere with reception of safety messages among user devices in the network, and potentially with other wireless communications. Especially if the UE is relatively stationary or static, or if there is relatively little traffic activity in its environment, it may be possible to reduce safety message communications without compromising the effectiveness of the V2X network.

Hence, it may be desirable to dynamically adjust and reduce V2X-related communications of the out-of-coverage UE. The UE may operate to autonomously assess traffic-related activity in its environment and adjust scheduling of safety message communications based in part on these assessments.

According to some embodiments, the UE may monitor for and evaluate certain synchronization (sync) messages sent by one or more other user devices, e.g., other UEs participating in the V2X network, in order to assess their motion- or location-related activity. In various embodiments, the other user devices may or may not also be out of cellular coverage. In the case of out-of-coverage user devices, the sync messages may be sent periodically, i.e., with a fixed frequency, in order to more easily harmonize communications absent an intermediary base station. The other user devices may broadcast sync messages with a frequency of every 40 ms, for example.

In some embodiments, the UE may be able to estimate the activity states or motion-related characteristics, such as speed, of the other user devices, by evaluating values relating to the signal strength of subsequent sync messages. For example, the UE may assess the changing rates of the reference signal received power (RSRP) or signal-to-noise ratio (SNR) levels of consecutive sync messages broadcast by a nearby user device (i.e., one of the other user devices in the V2X network). The UE may compare values representing the quality or change in quality of a certain number of the sync messages to threshold values in order to assess the nearby user device's speed, position, or other activity-related parameters.

In some embodiments, the UE may monitor the subframe timing of the sync messages of one or more other user devices in order to assess their speeds or other movement-related factors. For example, the UE may monitor the speed of subframe timing change of the sync signal of a nearby user device in order to assess the movement (e.g., direction or speed, etc.) of the nearby user device in relation to the UE.

The UE may adjust the scheduling of its safety message communications based at least in part on its assessments of the activity of the other user devices. The UE may adjust the frequency with which it monitors for incoming safety message and transmits outgoing safety messages. For example, if the UE determines that the other user devices are relatively static, e.g., not in high mobility states, then the UE may reduce the frequency with which it transmits and/or receives safety messages. Conversely, if the UE determines that one or more of the other user devices are relatively active and/or close, e.g., moving at high speeds or in high mobility states, the UE may increase the frequency with which it performs safety message communications.

In some embodiments, the UE may adjust its V2X communications scheduling based on other factors, instead of or in addition to the activity of nearby user devices. For example, the UE may also consider its own state of activity or power capabilities. If the UE is relatively static and/or relatively power-limited (e.g., because its battery strength or power level is low), then the UE may tend to communicate safety messages less frequently.

In some embodiments, the UE may adjust its scheduling of safety message communications by adjusting the number of transmission periods, or cycles, in which the UE does not perform transmissions that occur in-between cycles in which it does perform transmissions. The UE may adjust a "repeat count" value that indicates the number of transmission cycles to be skipped in-between transmissions.

In some embodiments, the out-of-coverage UE may communicate information indicating adjusted safety message transmission scheduling to the other user devices. For example, the UE may communicate the repeat count value to one or more of the other user devices, e.g., by including the repeat count value in one or more of its transmitted safety messages. In some embodiments, the safety message format may be extended to accommodate this information, e.g., with a "repeat count" field. The other user devices may then adjust their monitoring behavior according to the UE's updated transmission scheduling information so that they more efficiently monitor for the UE's safety messages only when the messages are scheduled to be transmitted.

Figure 9:
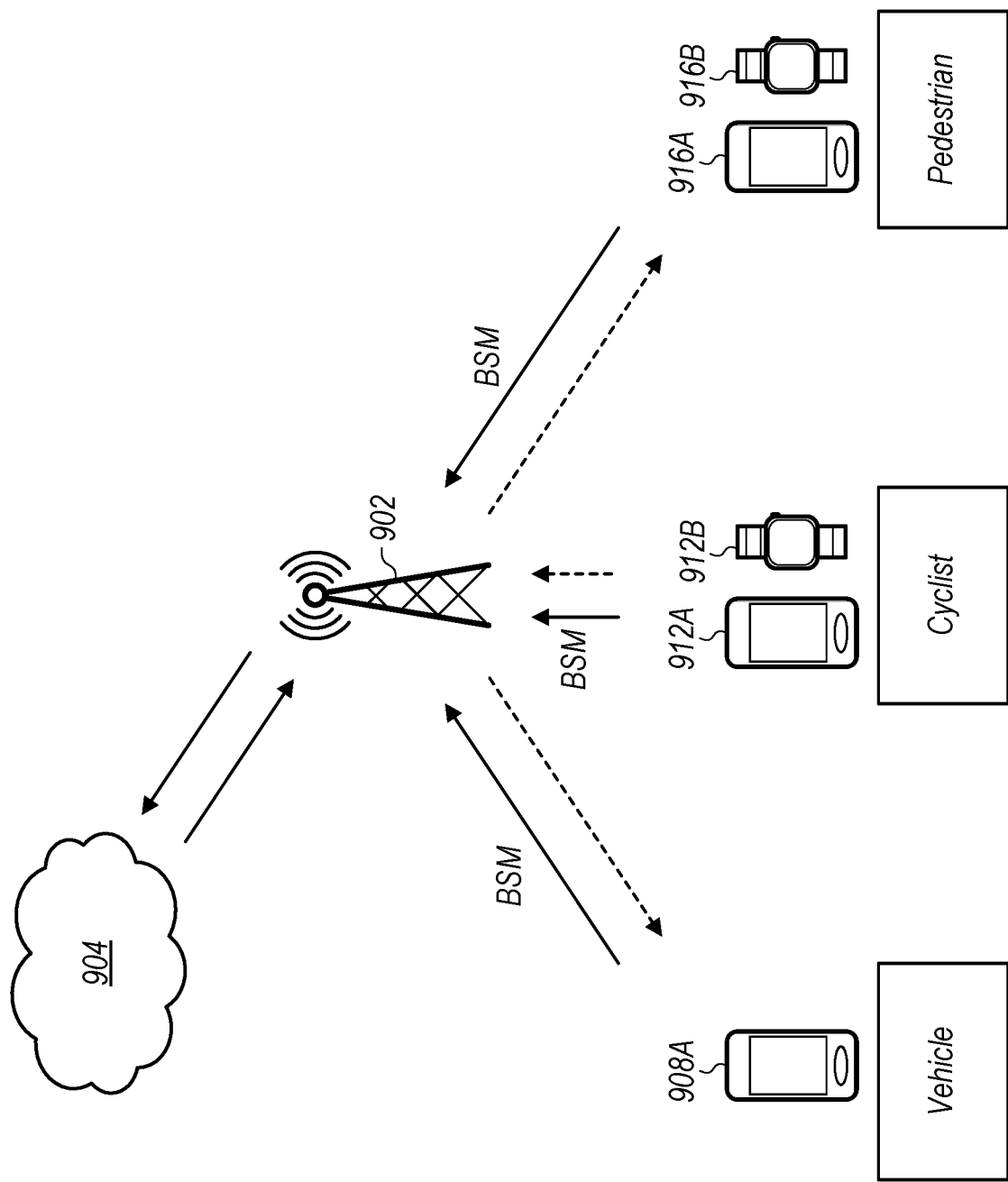
FIG. 9 illustrates an example V2X network wherein user devices in the network may conduct V2X communications with a central base station 902, according to some embodiments.

FIG. 9—Safety Message Communications Via Intermediary Base Station

FIG. 9 shows an example V2X network wherein user devices in the network may conduct V2X communications with a central base station 902, rather than communicate directly with one another via sidelink channels. The base station 902 may also perform V2X-related communications with a server 904.

As shown, user devices in the network may include: a vehicle and its associated wireless communications equipment, which may be a UE 908A as shown, collectively referred to as the vehicle 908; a cyclist and the V2X-participating UE 912 that they may carry, such as a smartphone 912A or smartwatch UE 912B, as shown; and a pedestrian user and the V2X-participating UE 916 they may carry, such as a smartphone 916A or smartwatch 916B.

As detailed above, user devices participating in the V2X network (e.g., the user devices 908, 912, and 916) may communicate routine safety messages containing various information to the network. Safety messages may be broadcast periodically, e.g., every 200 ms. In some embodiments, safety messages may conform to a Basic Safety Messages (BSM) format as described below with regard to FIG. 10. Safety messages may be used to help coordinate traffic among users in the network, including to avert vehicular collisions (e.g., to avert the vehicle 908 from colliding with the pedestrian carrying PUE 916).

In some embodiments of V2X systems, safety messages may be intended to be communicated directly between user devices by means of direct sidelink channels, e.g., using the PC5 sidelink interface. Sidelink communications of safety messages, as opposed to communications through intermediary devices such as base stations, may tend to provide faster communications and reduce latency and delays, which may tend to allow for more effective traffic coordination. However, in some cases, as shown, one or more of the user devices in the V2X network may be unable to or otherwise may not perform V2X communication with one another via sidelink channels. For example, certain wireless communications devices, e.g., PUE 916, may lack necessary hardware to perform certain sidelink communications. In this context, such devices may be referred to as "legacy" or sidelink-disabled devices.

It may still be desirable for legacy devices (that may be incapable of performing certain V2X sidelink communications) to participate and communicate safety messages in the V2X system, since the participation of more user devices may tend to increase the effectiveness and safety of the V2X system. Thus, in some embodiments, some user devices that may not perform sidelink communications may instead perform safety message communications with the base station 902. For example, the legacy PUE 916 may transmit safety messages (e.g., BSMs) to the base station 902, as well as receive V2X (or traffic-related) information derived from other user devices' safety messages from the base station 902. In the case of networks and devices using the 5G New Radio (5G NR) radio access technology (RAT), the PUE 916 may transmit safety messages via the 5G NR Uu cellular interface.

In some embodiments where safety messages are communicated to one or more intermediary infrastructure devices (e.g., the base station 902), the network may perform processing of safety messages in order to construct various traffic coordination messages, which it may then communicate back to the user devices. The traffic coordination messages may include safety or collision warnings, navigation assistance information, or various other information.

Traffic coordination messages may be constructed by various means. In some cases, the base station 902 may relay safety messages (or information derived from safety messages) to the server 904. The server 904 may then process the safety message information and construct resulting traffic coordination messages, such as collision warnings or navigation assistance messages. The traffic coordination messages may then be communicated back to user devices via the intermediary base station 902.

In other cases, the base station 902 may itself process and aggregate safety messages to construct the traffic coordination messages, which may comprise position and movement information for multiple user devices. More specifically, the base station may be configured to receive safety messages from a plurality of different respective UEs, wherein for each respective UE the safety message including position information of the respective UE for use in avoiding vehicular collisions. The base station may then aggregate information from each of the safety messages, e.g., may aggregate the position information and/or other information in the safety messages from each of the UEs. The base station 902 may then broadcast this information to multiple user devices in the network, e.g., via a point-to-multipoint interface (such as the Evolved Multimedia Broadcast Multicast Services, or MBMS, in 3GPP cellular networks). In these cases, received traffic coordination messages may be processed by the user devices and may prompt and/or inform various subsequent actions by the user devices.

Such indirect V2X communications conducted through intermediary devices, such as the intermediary base station 902, may pose several challenges. In addition to frequent communication of safety messages straining power-limited user devices, such as UEs 912 and 916, communication of safety message information through the intermediary base station 902 and remote processing of aggregated safety messages by the base station 902 or server 904 may lead to significant delays. For example, the above-described process wherein safety message information is communicated to and processed by the server 904, and resulting traffic coordination messages are communicated back to user devices, may consume a significant period of time (e.g., 300 ms). Such delays may interfere with the ability of the network to effectively and safely coordinate traffic activity. Thus, improved methods of scheduling and conducting communications of V2X safety messages from sidelink-disabled user devices to an intermediary base station may be desired.

Figure 10:
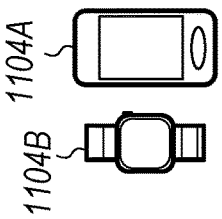
FIG. 10 illustrates an example format of a V2X safety message, specifically a possible Basic Safety Message (BSM) format, according to some embodiments.

FIG. 10—Basic Safety Message (BSM) Format

FIG. 10 shows an example format of a safety message, specifically a possible Basic Safety Message (BSM) format. The safety message may constitute a routine message generated and communicated by a user device in a V2X network, or a routine message otherwise generated and communicated within the network to represent the user device. The safety message may be usable by the network to coordinate traffic activity, among other purposes.

The safety message format may include various identification, administrative, or header information. As shown, the BSM format may include a Message ID usable by the network to distinguish the safety message from messages representing other user devices. The format may include temporary identification information usable to identify the user device, e.g., a Temporary ID, which may, by being temporary, provide some level of privacy to the user device (or its user). As shown, the safety message may also include one or more timestamp parameters, e.g., a Timestamp value, which may represent the time(s) at which the message was generated or communicated or at which certain information contained in the message was collected.

The safety message format may include various position-related information. This may include latitude and longitude measurements, as well as an elevation value, as shown. The message may include positional accuracy information indicating the degree to which certain position measurements are expected to be accurate, e.g., a PositionalAccuracy parameter, as shown.

The safety message may include information representing the motion (or "mobility") of the user device. This may include speed and acceleration parameters, as shown. In some cases, it may also include a parameter indicating the state of any braking action performed by the user device (or by a vehicle represented by the user device), such as the BrakeSysStatus parameter shown.

The safety message may include information indicating other characteristics of the user device, or of a vehicle or other mobile actor it represents. For example, the safety message may include a VehicleSize parameter, which may be usable for indicating the size of a vehicle.

Note that while some embodiments of a safety message format is shown in FIG. 10 as an example, namely, an example BSM format, safety messages are not limited to the format shown, and in various cases or embodiments may include various other information that is not shown or may not include various parameters shown.

Figure 11:
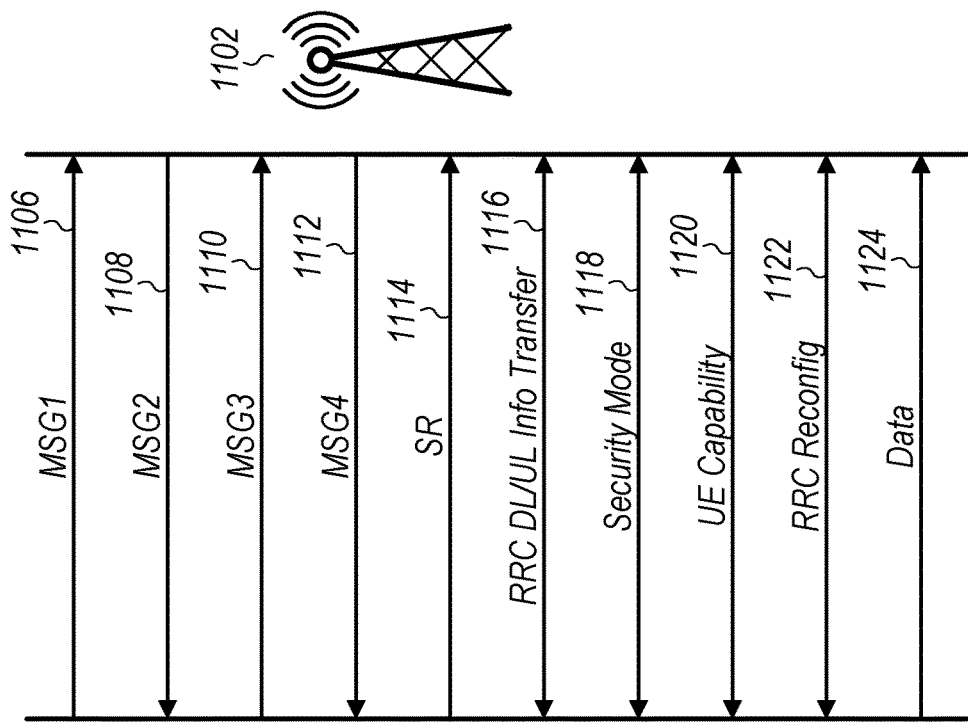
FIG. 11 shows an example random-access channel (RACH) procedure according to existing cellular communications standards.

FIG. 11—Example RACH Procedure

FIG. 11 shows an example random-access channel (RACH) procedure according to existing cellular communications standards. A UE 1104, which, for example, may be a smartwatch 1104B or smartphone 1104A as shown, may perform such a RACH procedure in order to register with and conduct subsequent communications with a base station 1102.

The initial RACH procedure, whereby the UE 1104 may perform initial registration with the base station 1102, may begin at step 1106. Here, the UE 1104 may send a first RACH message "MSG1" to the base station 1102. This first message may constitute a RACH Preamble (PRACH) message.

At 1108, in response to the first message, the base station 1102 may reply with a second message "MSG2" communicated to the UE 1104. This message may constitute a PRACH response message, and may specify resources (i.e., provide an uplink grant) for the UE to transmit a subsequent third message. The second message may also specify resources for the UE to receive a possible subsequent fourth message from the base station.

At 1110, the UE 1104 may send a third message "MSG3" to the base station 1102. The third message may constitute a Radio Resource Control (RRC) Connection Request message. The third message may be communicated using resources specified by the base station 1102 in the previous second message.

At 1112, the base station 1102 may transmit a fourth message "MSG4" to the UE 1104, which may constitute an RRC Connection Setup message. The UE may receive this fourth message using resources specified earlier via the second message as mentioned above.

The above-described communication of these four primary messages at steps 1106, 1108, 1110, and 1112, may essentially constitute the RACH procedure used to perform initial registration of the UE 1104 with the base station 1102. Subsequent communications between the base station 1102 and the UE 1104 may allow for the conveyance of data between the UE and the base station. These subsequent communications may include, for example, a scheduling request message sent from the UE to the base station at 1114, RRC downlink/uplink information transfer communications at 1116, security mode communications at 1118, a UE capability communication at 1120, RRC reconfiguration communications at 1122, and a transmission of data from the UE to the base station at 1124.

Methods described below with regard to FIG. 12 and FIG. 13 may utilize similar procedures, i.e., modified RACH-based procedures, in order to conduct safety message communications in V2X contexts.

Figure 12:
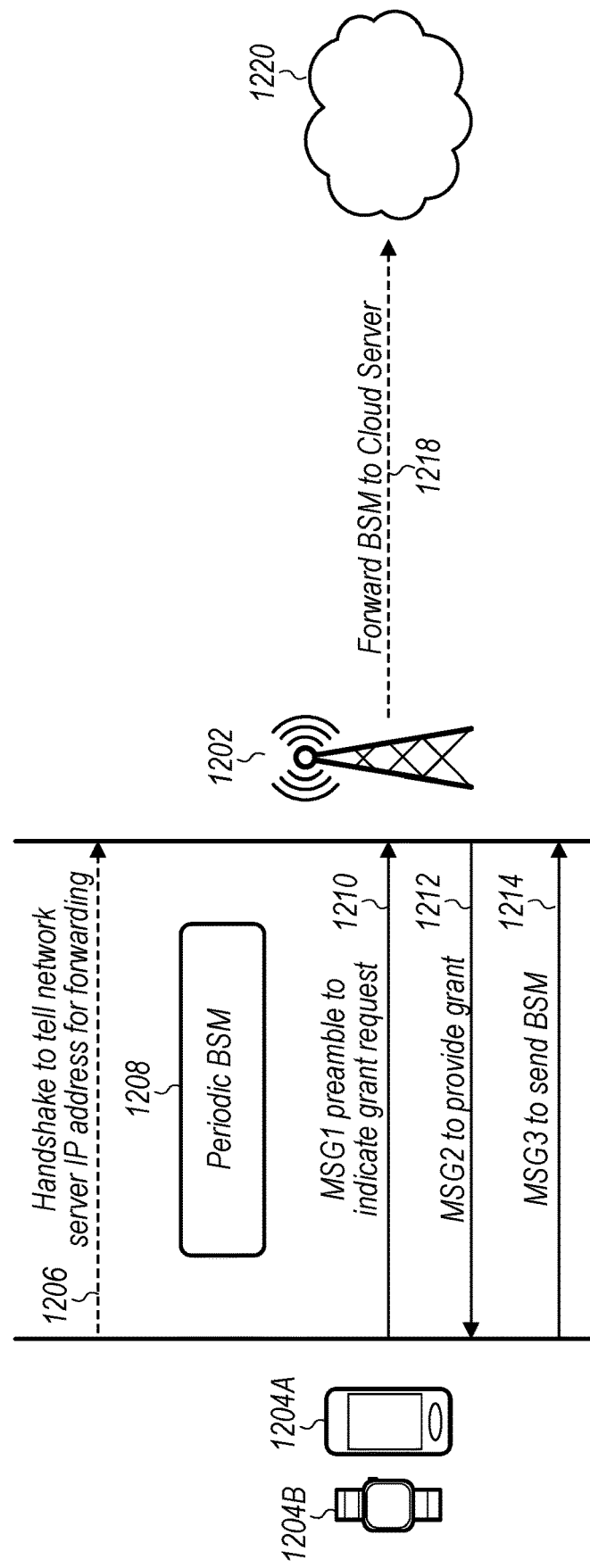
FIG. 12 illustrates a method by which a UE may communicate safety messages (e.g., BSMs) to a base station via a proposed modified three-step random-access channel (RACH) procedure, i.e., a three-step RACH-based procedure, according to some embodiments.

FIG. 12—Safety Message Transmission Via Three-Step RACH Procedure in Idle State

FIG. 12 illustrates a method by which a UE 1204 may communicate safety messages (e.g., BSMs) to a base station 1202 via a proposed modified random-access channel (RACH) procedure, i.e., a RACH-based procedure. By incorporating safety message transmissions into a RACH communications framework, a V2X network may communicate safety messages more efficiently, and may mitigate power consumption and communication delays. This may be especially important for legacy UE devices, which may be unable to communicate directly with other user devices via a sidelink interface such as PC5 in the case of certain LTE embodiments, and may communicate with the network via a cellular interface such as the Uu interface.

This method may apply to V2X networks and devices communicating using the 5G NR RAT, or other possible RATs. The example UE 1204 may be a PUE and/or a smartwatch 1204B or smartphone 1204A as shown, or another type of power-constrained user device.

At 1206, in certain embodiments that involve forwarding safety message information to a server, e.g., the cloud server 1220, the UE may perform a preliminary procedure to indicate to the V2X network (e.g., the base station 1202) the server to which subsequent safety messages (or information derived therefrom) are to be forwarded. In these embodiments, at 1206 the UE may communicate a preliminary message to the base station 1202. The preliminary message may, for example, include the server's IP address, e.g., the IP address of the cloud server 1220. This preliminary "handshake" procedure may take place upon (or as part of) an initial RRC connection between the UE 1204 and base station 1202.

The preliminary procedure at 1206 may or may not be performed in different embodiments. As described above with regard to FIG. 9, in some first embodiments, safety message information communicated from the UE 1202 to the base station 1202 may be relayed to a separate cloud server, e.g., server 1220 as shown, for processing. In other second embodiments, the base station 1202 may itself aggregate and process safety message information, and may not relay this information to the server 1220. In the second embodiments where information may not be relayed to the cloud server 1220, the preliminary procedure at 1206 may not be necessary and may not be performed. Conversely, in the first embodiments where messages may be forwarded to the server 1220, the UE may need to perform the preliminary procedure at 1206 prior to transmitting safety messages according to RACH-based methods.

At 1208, the UE may begin to communicate safety messages via the RACH-based procedure. In the above-mentioned second embodiments which may not involve processing by the cloud server 1220, operation may skip step 1206, and begin here at 1208.

Prior to performing the message transmission process, the UE may first construct a safety message, for example, a Basic Safety Message (BSM), containing various measurements and parameters as described above.

At 1210, the UE 1204 may transmit a first RACH message to the base station 1202. The first message may constitute a RACH Preamble (PRACH) message, and may indicate a request by the UE for safety message scheduling information, i.e., a request for an uplink grant for transmitting the safety message. Thus transmission of the first RACH message may be performed by the UE in order to enable subsequent transmission of a safety message to the base station. In other words, transmission of the first RACH message by the UE may be performed for the purpose of subsequent transmission of a safety message, and is not performed to obtain a connected state for transmission of other types of information, e.g., a voice call or other data.

At 1212, the base station 1202 may respond to the first message by sending a second RACH message to the UE 1204. The second message may constitute a PRACH Response message, and may indicate resources allocated for communication of the safety message, i.e., the requested uplink grant.

At 1214, the UE 1204 may transmit a third RACH message to the base station 1202 according to the uplink grant received in the prior step 1212. This third message may comprise the safety message, e.g., the BSM.

At this point, the safety message may have been successfully communicated to the network, e.g., to the base station 1202. In embodiments where the UE's safety message information is forwarded to a server for processing, then at 1218 the base station may forward the safety message information to the server 1220. In other embodiments where the base station does not forward the UE's safety message information to the cloud server 1220, but itself performs processing of safety message information, then step 1218 may not be performed.

Steps 1210, 1212, and 1214 (as well as step 1218 in a subset of embodiments as described above) may repeat for subsequent safety message transmissions. Since three primary RACH messages are communicated in this method, this method may be referred to as a "three-step" RACH (or RACH-based) procedure. Note that this modified RACH-based procedure may not result in the UE 1204 having established a connected state with the base station 1202. If the UE is to transmit another separate communication (e.g., a non-V2X-related communication) to the base station 1202, then it may be necessary for the UE to perform a different RACH procedure in order to conduct this separate communication.

Safety Message Transmissions Via Two-Step RACH Procedure in Idle State

Figure 13:
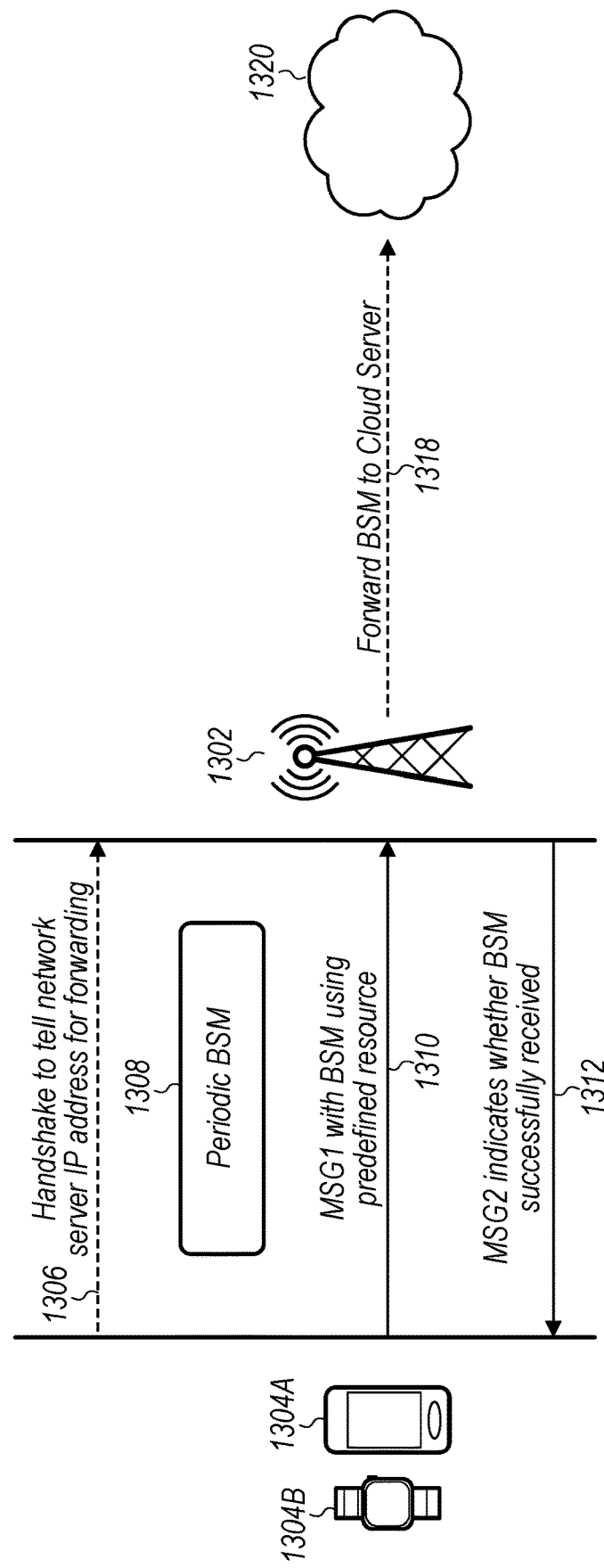
FIG. 13 illustrates a method by which a UE may communicate safety messages (e.g., BSMs) to a base station via a proposed modified two-step random-access channel (RACH) procedure, i.e., a two-step RACH-based procedure, according to some embodiments.

FIG. 13 illustrates a method by which a UE 1304 may communicate safety messages to a base station 1302 via a second proposed modified random-access channel (RACH) procedure, i.e., a second RACH-based procedure. This procedure involves exchanging two primary RACH message communications, and hence may referred to as a two-step procedure, differentiating it from the three-step procedure described above with regard to FIG. 12. As with the three-step procedure described above, this method may apply to V2X networks and devices communicating using the 5G NR RAT, or other possible RATs. The example UE 1304 may be a PUE and/or a smartwatch 1304B or smartphone 1304A as shown, or another type of user device.

At 1306, the UE 1304 may perform a preliminary handshake procedure in certain embodiments which involve processing of safety message information by the server 1320, as described above with regard to step 1206 of FIG. 12. In these embodiments, operation then proceeds to 1308. As with the method described above with regard to the three-step RACH-based method, in certain embodiments that may not involve processing at the server 1320, operation according to this method may skip step 1306 and begin at 1308.

At 1308, the UE 1304 may begin to communicate safety messages via the two-step RACH-based procedure. It may first construct a safety message, e.g., a Basic Safety Message (BSM), containing various measurements and parameters.

At 1310, the UE 1304 may transmit a first RACH message that comprises the safety message to the base station 1302. Thus, according to this method, the safety message may be sent promptly as part of the first message, e.g., in the payload of the first message. This may operate to significantly reduce latency between communication of the safety message and certain communications from the network, e.g., a traffic coordination message. The first message may constitute a RACH Preamble (PRACH) message, and its preamble may include UE identification information usable by the network to distinguish the UE.

In some embodiments, the network may have defined or predefined resources (i.e., may have provided an uplink grant) usable for the transmission of the first RACH message, prior to transmission of the first message at 1310. In some cases, these predefined resources may be shared by one or more other user devices participating in the V2X network, and in some (higher-traffic) scenarios there may be a relatively high chance that other user devices' communications may interfere or collide with the UE's communication of the first message at 1310. Thus, while this two-step approach may allow for prompt communication of the safety message, it may be vulnerable to the possibility that the safety message will not be properly received by the base station 1302.

At 1312, the base station may transmit a second RACH message to the UE 1304, which may indicate whether or not it has successfully received the safety message sent at 1310. If the base station determines that the safety message was successfully received, then operation may or may not proceed to step 1318 according to differing embodiments (in which safety message information may or may not be forwarded to the cloud server 1320), as described above with regard to step 1218 in FIG. 12.

Steps 1310 and 1312 (as well as step 1318 in a subset of embodiments as described above) may repeat for subsequent safety message transmissions. As mentioned above with regard to the three-step RACH-based method, performance of this modified two-step RACH-based procedure may not result in the UE 1304 having established a connected state with the base station 1302.

Note that either of the RACH-based approaches described above with regard to FIG. 12 and FIG. 13 may be used in various embodiments and various scenarios. In some embodiments, user devices in a V2X network may employ either method, among other safety message communication techniques, depending on various criteria.

Figure 14:
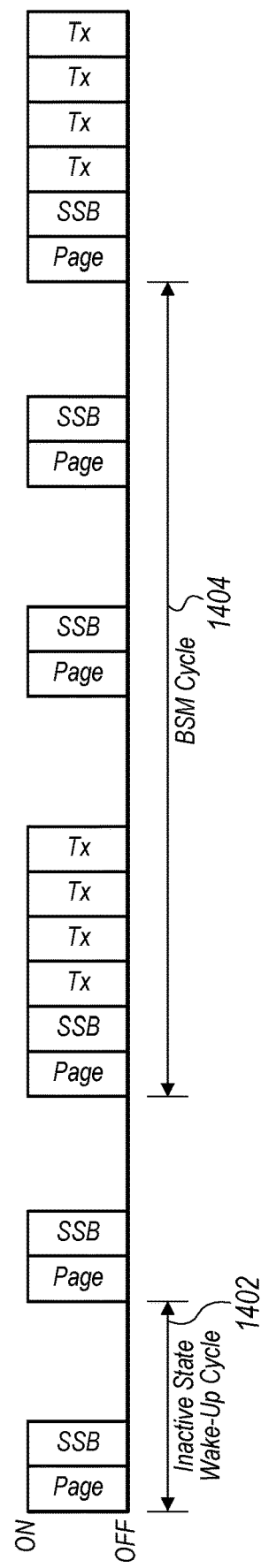
FIG. 14 illustrates example scheduling of safety message transmissions for a UE operating in an inactive state, according to some embodiments.

FIG. 14—Periodic Safety Message Transmission in 5G NR Inactive State

FIG. 14 illustrates example scheduling of safety message transmissions by a UE operating in an inactive state, according to some methods. The UE may be operating in an inactive state as defined by certain communications standards, such as 5G NR standards. While in an inactive state, the UE may not maintain an active connection with a cellular base station. However, as a participant in a V2X system, the UE may still operate to transmit routine safety messages.

In some embodiments, the UE may dynamically utilize a special page/paging procedure to request resources for transmitting safety messages when needed. Here, a special page type may be defined for requesting uplink resources for the transmission of safety message in V2X contexts. The UE may page the network, e.g., the base station, in order to request uplink grants.

In other embodiments, the UE may, when it transitions from a connected state to the inactive state, request periodic uplink grants usable to transmit safety messages during its inactive state wake-up instances, i.e., its wake-up "on" durations. The UE may transmit a request to the V2X network, e.g., the base station, for the periodic uplink grants. The network (e.g., the base station) may respond by allocating uplink resources to the UE and communicating these uplink resources, i.e., the periodic uplink grants, to the UE. The UE may then transmit subsequent safety messages during its periodic wake-up durations as scheduled by the network, i.e., according to the allocated periodic uplink grants received by the network (e.g., the base station).

UE Power Conservation Via Reducing Safety Message Size

As described above, it may be desirable to reduce the resources consumed by performing safety message communications in a V2X network. Reducing the resource usage of safety message communications may be especially important for UE devices, which are generally relatively power-limited and resource-constrained. These may include pedestrian UEs (PUEs) and other UEs participating in the V2X network.

In various embodiments, the size of safety messages (or safety message communications) may be adjusted and reduced, which may tend to reduce the resources consumed by performing safety message communications. The size of safety messages (or safety message communications) may be reduced through various compression techniques, and/or by reducing the amount of information contained in safety messages, e.g., by omitting certain parameters.

In some embodiments, compression techniques may be used to reduce the size of safety messages or safety message transmissions. For example, a UE may perform a header compression of safety message transmissions, such as a Robust Header Compression (ROHC). In some cases, the UE may perform other compression procedures on data contained in its safety messages.

In some embodiments, certain contents of safety messages may be omitted in order to reduce the size of safety messages. Certain user devices in certain scenarios may operate to leave out certain information that may otherwise be included in safety messages. Some safety message parameters may be irrelevant or less relevant to certain types of users or user devices, or to user devices in certain states.

In some embodiments, pedestrian UEs (PUEs) may not use certain safety message fields that may be used by vehicles, such as acceleration, brake status, or vehicle size parameters. For example, a PUE may transmit safety messages including certain header and identification information, basic position information (such as latitude, longitude, and elevation), and basic speed and direction information, but may omit other information that may be included in the safety messages of other types of user devices.

In some embodiments, certain user devices may operate to omit certain information if this information is relatively unchanged, and/or if the information can be interpolated or estimated by the network with some degree of accuracy. For example, a UE may operate not to include position information in a new safety message if its position information is determined to be similar to that included in one or more prior safety messages to a certain degree. In some embodiments, the network may operate to interpolate certain safety message information omitted by the UE based on information contained in prior safety messages.

The size and contents of safety messages may be adjusted as described above according to various criteria, such as those described herein with regard to safety message scheduling, including factors relating to the mobility, movement, location, coverage, and power capabilities of one or more user devices. In various embodiments and scenarios, methods of adjusting the size of safety message communications may be utilized along with or instead of other methods for reducing the resource consumption of safety message transmissions, such as methods of adjusting the scheduling of safety messages as described above.

According to various embodiments, scheduling, frequency, timing, size, contents, and volume of safety message communications, as well as the means by which safety messages are communicated, may be adjusted according to various criteria in order to conserve power in power-limited devices and to increase the overall efficiency and efficacy of V2X systems.

As described above, one aspect of the present technology is the gathering and use of data available from specific and legitimate sources to improve coordination of traffic flow in traffic environments. The present disclosure contemplates that in some instances, this gathered data may include personal information data that uniquely identifies or can be used to identify a specific person. Such personal information data can include demographic data, location-based data, online identifiers, telephone numbers, email addresses, home addresses, data or records relating to a user's health or level of fitness (e.g., vital signs measurements, medication information, exercise information), date of birth, or any other personal information.

The present disclosure recognizes that the use of such personal information data, in the present technology, can be used to the benefit of users. For example, the personal information data may be used to better harmonize traffic flow in the user's environment, such that transportation of the user and other users becomes more efficient. Further, the personal data may improve safety of the user (and other users) by averting traffic accidents, particularly vehicular collisions. For example, in the case of a pedestrian user, the personal information, particularly movement- and position-related information, may operate to avert potentially fatal collisions between vehicles and the user. Also, the personal information may be usable to reduce resource and power consumption by user devices benefitting from traffic-related networks, which may improve users' experiences.

The present disclosure contemplates that those entities responsible for the collection, analysis, disclosure, transfer, storage, or other use of such personal information data will comply with well-established privacy policies and/or privacy practices. In particular, such entities would be expected to implement and consistently apply privacy practices that are generally recognized as meeting or exceeding industry or governmental requirements for maintaining the privacy of users. Such information regarding the use of personal data should be prominent and easily accessible by users, and should be updated as the collection and/or use of data changes. Personal information from users should be collected for legitimate uses only. Further, such collection/sharing should occur only after receiving the consent of the users or other legitimate basis specified in applicable law.

Additionally, such entities should consider taking any needed steps for safeguarding and securing access to such personal information data and ensuring that others with access to the personal information data adhere to their privacy policies and procedures. Further, such entities can subject themselves to evaluation by third parties to certify their adherence to widely accepted privacy policies and practices. In addition, policies and practices should be adapted for the particular types of personal information data being collected and/or accessed and adapted to applicable laws and standards, including jurisdiction-specific considerations that may serve to impose a higher standard. For instance, in the US, collection of or access to certain health data may be governed by federal and/or state laws, such as the Health Insurance Portability and Accountability Act (HIPAA); whereas health data in other countries may be subject to other regulations and policies and should be handled accordingly.

Despite the foregoing, the present disclosure also contemplates embodiments in which users selectively block the use of, or access to, personal information data. That is, the present disclosure contemplates that hardware and/or software elements can be provided to prevent or block access to such personal information data. For example, the present technology can be configured to allow users to select to "opt in" or "opt out" of participation in the collection of personal information data for use in vehicle- and transportation-related networks. In another example, users can select not to provide certain personal data, such as location or movement data, to V2X networks for traffic safety and coordination purposes. In yet another example, users may be able to select to limit the length of time or degree to which traffic-associated data is maintained or entirely block the development of a baseline traffic or vehicle profile. In addition to providing "opt in" and "opt out" options, the present disclosure contemplates providing notifications relating to the access or use of personal information. For instance, a user may be notified that their personal information data will be accessed for use in vehicle and transportation networks.

Moreover, it is the intent of the present disclosure that personal information data should be managed and handled in a way to minimize risks of unintentional or unauthorized access or use. Risk can be minimized by limiting the collection of data and deleting data once it is no longer needed. In addition, and when applicable, including in certain health related applications, data de-identification can be used to protect a user's privacy. De-identification may be facilitated, when appropriate, by removing identifiers, controlling the amount or specificity of data stored (e.g., collecting location data at city level rather than at an address level), controlling how data is stored (e.g., aggregating data across users), and/or other methods such as differential privacy.

Therefore, although the present disclosure broadly covers use of personal information data to implement one or more various disclosed embodiments, the present disclosure also contemplates that the various embodiments can also be implemented without the need for accessing such personal information data. That is, the various embodiments of the present technology are not rendered inoperable due to the lack of all or a portion of such personal information data. For example, content can be selected and delivered to users based on aggregated non-personal information data or a bare minimum amount of personal information, such as the content being handled only on the user's device or other non-personal information available to the content delivery services.

Further embodiments of the invention are described below in the following paragraphs:

In some embodiments, a cellular base station comprises: at least one antenna for performing wireless communications; a radio coupled to the at least one antenna; and a processing element coupled to the radio; wherein the cellular base station has an associated cellular coverage area; wherein the base station is configured to: determine mobility information of UEs in the cellular coverage area; and provide notification to a plurality of UEs in the cellular coverage area specifying a frequency of uplink safety message transmission, wherein the frequency of the uplink safety message transmission is based on the determined mobility information.

In at least some embodiments, the base station is further configured to determine a frequency value of uplink safety message transmission based on the mobility information; wherein in providing the notification provide the base station is configured to provide the frequency value to the plurality of UEs.

In at least some embodiments, the mobility information comprises a mobility value indicating overall mobility of UEs in the cellular coverage area; wherein the base station is configured to compare the mobility value with a threshold to determine whether the UEs in the cellular coverage area are relatively static or relatively active.

In at least some embodiments, the mobility value comprises a UE speed statistic value.

In at least some embodiments, the UE speed statistic value comprises an average speed.

In at least some embodiments, the UE speed statistic value comprises a maximum speed.

In at least some embodiments, the UE speed statistic value comprises a ratio of UEs whose current speed is greater than a threshold.

In at least some embodiments, the base station is further configured to determine that a first UE has recently entered the cellular coverage area and provide a notification to the first UE specifying a default frequency of uplink safety message transmission.

In at least some embodiments, the uplink safety message transmission each comprises position information of the UE for use in avoiding collisions with vehicles.

In at least some embodiments, the uplink safety message transmission each comprises identification, position, timestamp, and speed information of the UE for use in avoiding collisions with vehicles.

Another set of embodiments may comprise a user equipment (UE), comprising: at least one antenna for performing wireless communications; a radio coupled to the at least one antenna; and a processing element coupled to the radio; wherein, when the UE is outside of a cellular coverage area, the UE is configured to: monitor synchronization messages sent by nearby UEs in the first cellular coverage area to determine a relative speed of the nearby UEs; and adjust a frequency of transmitted safety messages in response to determined mobility states of nearby UEs.

In at least some embodiments, the UE is configured to estimate the relative speed of nearby UEs by monitoring one or more of a reference signal received power or a signal to noise ratio level changing rate of the nearby UEs.

In at least some embodiments, in estimating the relative speed of nearby UEs, the UE is configured to determine if a quality of synchronization messages changes less than a threshold amount for a number of consecutive sensing instances.

In at least some embodiments, the UE is configured to reduce a frequency of transmitted safety messages in response to determining that the nearby UEs do not have a high mobility.

In at least some embodiments, during a time of reduced frequency of transmitted safety messages, the UE is configured to include a repeat count value in at least one transmitted safety message indicating a number of future cycles in which the safety messages will not be transmitted.

In at least some embodiments, the UE is configured to increase a frequency of transmitted safety messages in response to determining that the nearby UEs have a high mobility.

In at least some embodiments, the UE is configured to adjust a frequency of transmitted safety messages in response to both a current mobility state of the UE and determined mobility states of nearby UEs.

In at least some embodiments, the UE is configured to reduce a frequency of transmitted safety messages in response to determining that the UE is in a low mobility state and that the nearby UEs do not have a high mobility.

In at least some embodiments, the UE is configured to increase a frequency of transmitted safety messages in response to determining that the UE is in a high mobility state and that the nearby UEs also have a high mobility.

In at least some embodiments, the UE is configured to adjust a frequency of both transmission of safety messages and monitoring of safety messages transmitted by other UEs.

In at least some embodiments, the transmitted safety messages comprise position information of the UE for use in avoiding collisions with vehicles.

Another set of embodiments may comprise a user equipment (UE), comprising: at least one antenna for performing wireless communications; a radio coupled to the at least one antenna; and a processing element coupled to the radio;

wherein the UE is configured to: transmit a random-access channel (RACH) message to a base station requesting an uplink grant; receive a random-access response message from the base station in response to transmission of the RACH message, wherein the random-access response message includes the uplink grant; and transmit a safety message to the base station after receiving the random-access message, wherein the safety message includes position information of the UE for use in avoiding vehicular collisions.

In at least some embodiments, the UE is configured to discontinue transmitting to the base station after transmitting the safety message to the base station.

In at least some embodiments, the UE does not establish a connected state with the base station in response to the RACH message.

In at least some embodiments, the UE is further configured to, upon establishing a radio resource control (RRC) connection to the base station, and prior to transmitting the RACH message, transmit to the base station a destination address for use by the base station in forwarding of the safety message.

In at least some embodiments, transmission of the safety message after receiving the random-access message operates to provide the safety message to the base station with reduced latency compared to a full RACH procedure that results in a connected state between the UE and the base station.

In at least some embodiments, the safety message comprises identification, position, timestamp, and speed information of the UE for use in avoiding collisions with vehicles.

Another set of embodiments may comprise a cellular base station, comprising: at least one antenna for performing wireless communications; a radio coupled to the at least one antenna; and a processing element coupled to the radio; wherein the cellular base station has an associated cellular coverage area; wherein the base station is configured to: receive a random-access channel (RACH) message from a user equipment (UE); transmit a random-access response message to the UE in response to receipt of the RACH message; and receive a safety message from the UE after transmitting the random-access message, wherein the safety message includes position information of the UE for use in avoiding vehicular collisions.

In at least some embodiments, the base station does not establish a connected state with the UE in response to the RACH message.

In at least some embodiments, the base station is further configured to: upon establishing a radio resource control (RRC) connection with the UE, and prior to receipt of the RACH message from the UE, receive from the UE a destination address for forwarding of the safety message; wherein upon receipt of the safety message from the UE, the base station is configured to forward the safety message to the destination address.

Another set of embodiments may comprise a user equipment (UE), comprising: at least one antenna for performing wireless communications; a radio coupled to the at least one antenna; and a processing element coupled to the radio; wherein the UE is configured to: transmit a random-access channel (RACH) preamble to a base station, wherein the RACH preamble includes a temporary identifier and a safety message, wherein the safety message includes position information of the UE for use in avoiding vehicular collisions; and receive a random-access response message from the base station in response to transmission of the RACH preamble, wherein receipt of the random-access response indicates successful receipt of the safety message by the base station.

In at least some embodiments, the UE is configured to discontinue transmitting to the base station after transmitting the RACH preamble to the base station.

In at least some embodiments, the UE does not establish a connected state with the base station in response to the RACH preamble.

In at least some embodiments, the UE is further configured to: upon establishing a radio resource control (RRC) connection to the base station, and prior to transmitting the RACH preamble, transmit to the base station a destination address for use by the base station in forwarding of the safety message.

In at least some embodiments, transmission of the safety message in the RACH preamble operates to provide the safety message to the base station with reduced latency compared to a full RACH procedure that results in a connected state between the UE and the base station.

In at least some embodiments, the UE is further configured to receive an uplink grant from the base station prior to transmission of the RACH preamble, wherein the UE transmits the RACH preamble to the base station using the uplink grant.

Another set of embodiments may comprise a cellular base station, comprising: at least one antenna for performing wireless communications; a radio coupled to the at least one antenna; and a processing element coupled to the radio; wherein the cellular base station is configured to: receive a random-access channel (RACH) preamble from a user equipment (UE), wherein the RACH preamble includes a temporary identifier of the UE and a safety message, wherein the safety message includes position information of the UE for use in avoiding vehicular collisions; and transmit a random-access response message to the UE in response to receipt of the RACH preamble, wherein transmission of the random-access response indicates successful receipt of the safety message by the base station.

In at least some embodiments, the base station does not establish a connected state with the UE in response to the RACH preamble.

In at least some embodiments, upon establishing a radio resource control (RRC) connection with the UE, and prior to receipt of the RACH preamble from the UE, the base stations receives from the UE a destination address for forwarding of the safety message; wherein upon receipt of the safety message from the UE in the RACH preamble, the base station is configured to forward the safety message to the destination address.

In at least some embodiments the base station is further configured to transmit an uplink grant to the UE prior to receiving the RACH preamble from the UE, wherein the uplink grant is usable for UE transmission of the RACH preamble.

Another set of embodiments may comprise a user equipment (UE), comprising: at least one antenna for performing wireless communications; a radio coupled to the at least one antenna; and a processing element coupled to the radio; wherein the UE is configured to: transmit a request to a base station for periodic uplink grants during the UE's wake-up on duration for transmission of safety messages to the base station; receive an uplink grant from the base station in response to the request for periodic uplink grants during the UE's wake-up on duration; and transmit safety messages to the base station during the UE's wake-up on duration, utilizing the periodic uplink grants, wherein the safety message includes position information of the UE for use in avoiding vehicular collisions. The transmission of safety messages to the base station during the UE's wake-up on duration may allow the UE to send safety messages while in its inactive state.

Another set of embodiments may comprise a user equipment (UE), comprising: at least one antenna for performing wireless communications; a radio coupled to the at least one antenna; and a processing element coupled to the radio; wherein the UE is configured to: transmit a safety message to a base station, wherein the safety message includes information of the UE for use in avoiding vehicular collisions, wherein the safety message has a reduced size relative to a telecommunication standard size specification of a basic safety message (BSM).

In at least some embodiments, the UE is configured to perform compression on data contained in the safety message.

In at least some embodiments, at least one field of the safety message is unchanged relative to a prior safety message, and wherein the at least one field of the safety message that is unchanged is not populated with data.

In at least some embodiments, the UE is configured to determine its speed of motion; wherein the UE is configured to not transmit the safety message during a period of time when the speed of the UE is below a threshold; wherein the UE is configured to resume transmission of the safety message when the speed of the UE increases above the threshold.

Another set of embodiments may comprise a cellular base station, comprising: at least one antenna for performing wireless communications; a radio coupled to the at least one antenna; and a processing element coupled to the radio; wherein the cellular base station is configured to: receive safety messages from a UE, wherein the safety messages include position information and direction information of the UE for use in avoiding vehicular collisions; forward the safety messages to one of a server or other UE devices for use in avoiding vehicular collisions; store the safety messages in a memory; and upon nonreceipt of a safety message from a UE, estimate a current position of the UE based on past position and direction information of the UE and provide the current estimate of the position of the UE to one of the server or other UE devices for use in avoiding vehicular collisions.

Embodiments of the present disclosure may be realized in any of various forms. For example, some embodiments may be realized as a computer-implemented method, a computer-readable memory medium, or a computer system. Other embodiments may be realized using one or more custom-designed hardware devices such as ASICs. Still other embodiments may be realized using one or more programmable hardware elements such as FPGAs.

In some embodiments, a non-transitory computer-readable memory medium may be configured so that it stores program instructions and/or data, where the program instructions, if executed by a computer system, cause the computer system to perform a method, e.g., any of a method embodiments described herein, or, any combination of the method embodiments described herein, or, any subset of any of the method embodiments described herein, or, any combination of such subsets.

In some embodiments, a device (e.g., a UE 104) may be configured to include a processor (or a set of processors) and a memory medium, where the memory medium stores program instructions, where the processor is configured to read and execute the program instructions from the memory medium, where the program instructions are executable to implement any of the various method embodiments described herein (or, any combination of the method embodiments described herein, or, any subset of any of the method embodiments described herein, or, any combination of such subsets). The device may be realized in any of various forms.

Although the embodiments above have been described in considerable detail, numerous variations and modifications will become apparent to those skilled in the art once the above disclosure is fully appreciated. It is intended that the following claims be interpreted to embrace all such variations and modifications.

What is claimed is:

1. A cellular base station, comprising:
   at least one antenna for performing wireless communications;
   a radio coupled to the at least one antenna; and
   a processing element coupled to the radio;
   wherein the cellular base station has an associated cellular coverage area;
   wherein the base station is configured to:
      provide uplink scheduling information to a plurality of UEs in the cellular coverage area specifying scheduling of transmission resources for safety messages in a time window proximate to UE wake-up times;
      wherein the uplink scheduling information is transmitted to the plurality of UEs in a group downlink control channel utilizing a downlink control information (DCI) field reserved for vehicular communication safety application notifications, and wherein, for each UE, the safety message comprises position information of the UE for use in avoiding collisions with vehicles.

2. The base station of claim 1, wherein the uplink scheduling information specifying scheduling of transmission resources for safety messages in a time window proximate to a UE wake-up time operates to reduce power usage of the plurality of UEs by avoiding extra wake-ups for transmission of the safety messages.

3. The base station of claim 1, wherein the uplink scheduling information specifies use of Physical Uplink Shared Channel (PUSCH) resources for periodic transmission of the safety messages.

4. The base station of claim 1, wherein the uplink scheduling information is transmitted using downlink control information (DCI) and specifies aperiodic transmission of the safety messages.

5. The base station of claim 1, wherein the UE wake-up times are Connected Mode Discontinuous Reception (CDRX) wake-up times.

6. The base station of claim 1, wherein the base station is further configured to:
determine a first UE of the plurality of UEs that is in a low mobility state;
provide, in response to determining that the first UE is in the low mobility state, second uplink scheduling information to the first UE which reduces frequency of uplink transmission of the safety messages in order to save power of the first UE.

7. The base station of claim 6, wherein the base station is further configured to:
determine that position information has not been received from the first UE in a current period;
provide prior position information of the first UE for use by other UEs in response to the determination that position information had not been received from the first UE in the current period.

8. The base station of claim 6, wherein the base station is further configured to:
determine that the first UE has transitioned to a high mobility state;
provide, in response to determining that the first UE has transitioned to the high mobility state, third uplink scheduling information to the first UE which increases the frequency of uplink transmission of the safety messages.

9. The base station of claim 1, wherein the base station is further configured to:
wherein, for at least one of the plurality of UEs, the uplink scheduling information specifies a frequency of uplink transmission of safety messages that is based on a mobility state of the at least one UE.

10. A user equipment (UE), comprising:
at least one antenna for performing wireless communications;
a radio coupled to the at least one antenna; and
a processing element coupled to the radio;
wherein the UE is configured to:
receive and store uplink scheduling information from a cellular base station, wherein the uplink scheduling information specifies scheduling of transmission resources for safety messages in a time window proximate to wake-up times of the UE, and
wherein the uplink scheduling information is received in a group downlink control channel utilizing a downlink control information (DCI) field reserved for vehicular communication safety application notifications;
transmit safety messages proximate to wake-up times of the UE based on the received uplink scheduling information, wherein the safety messages comprise position information of the UE for use in avoiding collisions with vehicles.

11. The UE of claim 10, wherein the wake-up times of the UE are Connected Mode Discontinuous Reception (CDRX) wake-up times.

12. The UE of claim 10, wherein the UE is configured to transmit the safety messages at a frequency that is based on a mobility state of the UE.

13. A cellular base station, comprising:
at least one antenna for performing wireless communications;
a radio coupled to the at least one antenna; and
a processing element coupled to the radio;
wherein the cellular base station has an associated cellular coverage area;
wherein the base station is configured to:
provide uplink scheduling information to a plurality of UEs in the cellular coverage area specifying scheduling of transmission resources for safety messages;
wherein the uplink scheduling information is transmitted to the plurality of UEs in a group downlink control channel utilizing a downlink control information (DCI) field reserved for vehicular communication safety application notifications, and
wherein, for at least one of the plurality of UEs, the uplink scheduling information specifies a frequency of uplink transmission of safety messages that is based on a mobility state of the at least one UE.

14. The base station of claim 13, wherein the base station is further configured to:
determine a first UE of the plurality of UEs that is in a low mobility state;
provide, in response to determining that the first UE is in the low mobility state, second uplink scheduling information to the first UE which reduces frequency of uplink transmission of the safety messages in order to save power of the first UE.

15. The base station of claim 14, wherein the base station is further configured to:
determine that position information has not been received from the first UE in a current period;
provide prior position information of the first UE for use by other UEs in response to the determination that position information had not been received from the first UE in the current period.

16. The base station of claim 14, wherein the base station is further configured to:
determine that the first UE has transitioned to a high mobility state;
provide, in response to determining that the first UE has transitioned to the high mobility state, third uplink scheduling information to the first UE which increases the frequency of uplink transmission of the safety messages.

17. The base station of claim 13, wherein the base station is further configured to:
determine a first UE of the plurality of UEs that is in a high mobility state;
provide, in response to determining that the first UE is in the high mobility state, second uplink scheduling information to the first UE which increases frequency of uplink transmission of the safety messages.

18. The base station of claim 13, wherein for the at least one UE, the safety messages each comprises position, timestamp, and speed information of the UE for use in avoiding collisions with vehicles.

19. The base station of claim 13, wherein the base station is further configured to: receive mobility state information from the at least one UE indicating the mobility state of the at least one UE.

20. The base station of claim 13, wherein the UE wake-up times are Connected Mode Discontinuous Reception (CDRX) wake-up times.

* * * * *